US012803326B2

(12) United States Patent
Xiang et al.

(10) Patent No.: US 12,803,326 B2
(45) Date of Patent: Nov. 17, 2026

(54) METHOD AND APPARATUS FOR IDENTIFYING TOPOLOGY OF POWER LINE LOW-VOLTAGE TRANSFORMER AREA

(71) Applicant: Huawei Technologies Co., Ltd., Shenzhen (CN)

(72) Inventors: Chaobin Xiang, Chengdu (CN); Yang Liu, Beijing (CN); Yupeng Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 514 days.

(21) Appl. No.: 18/493,301

(22) Filed: Oct. 24, 2023

(65) Prior Publication Data

US 2024/0055892 A1 Feb. 15, 2024

Related U.S. Application Data

(63) Continuation of application No. PCT/CN2021/089710, filed on Apr. 25, 2021.

(51) Int. Cl.

| | |
|---|---|
| ***H02J 13/13*** | (2026.01) |
| ***H02J 13/12*** | (2026.01) |
| ***H02J 13/333*** | (2026.01) |

(52) U.S. Cl.
CPC ........... *H02J 13/1311* (2026.01); *H02J 13/12* (2026.01); *H02J 13/333* (2026.01)

(58) Field of Classification Search
CPC ...... H02J 13/1311; H02J 13/12; H02J 13/333; H04B 3/54
See application file for complete search history.

(56) References Cited

U.S. PATENT DOCUMENTS

| | | | | |
|---|---|---|---|---|
| 2006/0085346 A1* | 4/2006 | Riley | H04L 41/12 | 705/51 |
| 2015/0032278 A1* | 1/2015 | Bhageria | H02J 4/00 | 700/295 |
| 2015/0237130 A1* | 8/2015 | Hui | H02J 3/14 | 709/248 |

(Continued)

FOREIGN PATENT DOCUMENTS

| | | |
|---|---|---|
| CN | 107947370 A | 4/2018 |
| CN | 109274095 A | 1/2019 |

(Continued)

*Primary Examiner* — Rami R Okasha
(74) *Attorney, Agent, or Firm* — Conley Rose, P.C.

(57) ABSTRACT

A method for identifying a topology of a power line low-voltage transformer area includes that a primary node obtains characteristic data, where the characteristic data includes first characteristic data between any two secondary nodes that have a direct connection relationship in a plurality of secondary nodes in the low-voltage transformer area. The primary node identifies the topology of the low-voltage transformer area based on the characteristic data, where the characteristic data includes at least one of delay data or channel quality data, the delay data is a first delay for transmitting information on a power line between the two nodes that have a direct connection relationship, and the channel quality data is quality of a power line channel between the two nodes that have a direct connection relationship.

20 Claims, 20 Drawing Sheets

(56) References Cited

U.S. PATENT DOCUMENTS

| | | | | |
|---|---|---|---|---|
| 2015/0253367 | A1* | 9/2015 | Flammer, III | H02J 13/1323<br>324/76.77 |
| 2015/0372718 | A1* | 12/2015 | McConnell | H04B 3/544<br>375/257 |
| 2016/0097796 | A1* | 4/2016 | Flammer, III | H02J 13/1333<br>702/60 |
| 2016/0359677 | A1* | 12/2016 | Kulshreshtha | G06F 9/45558 |
| 2018/0356449 | A1* | 12/2018 | Léonard | H02J 13/13 |

FOREIGN PATENT DOCUMENTS

| | | | |
|---|---|---|---|
| CN | 109617231 | A | 4/2019 |
| CN | 110488129 | A | 11/2019 |
| CN | 110739774 | A | 1/2020 |
| CN | 111817301 | A | 10/2020 |
| WO | 2021052423 | A1 | 3/2021 |

* cited by examiner

METHOD AND APPARATUS FOR IDENTIFYING TOPOLOGY OF POWER LINE LOW-VOLTAGE TRANSFORMER AREA

CROSS-REFERENCE TO RELATED APPLICATIONS

This is a continuation of International Patent Application No. PCT/CN2021/089710 filed on Apr. 25, 2021, the disclosure of which is hereby incorporated by reference in its entirety.

TECHNICAL FIELD

This disclosure relates to the field of communication technologies, and in particular, to a method and an apparatus for identifying a topology of a power line low-voltage transformer area.

BACKGROUND

In a power network, power is transmitted to various places through high-voltage transmission lines, and high-voltage power can be converted into low-voltage power through transformers, to be transmitted to users through low-voltage distribution networks. The low-voltage distribution network of each transformer may be referred to as a low-voltage power transformer area, also referred to as a low-voltage transformer area. Identifying a topology (TOPO) of the low-voltage transformer area facilitates accurate power failure point analysis, refined line loss/impedance calculation, and three-phase unbalance processing, and is of great significance to refined and intelligent safety management of the low-voltage transformer area.

Cabling styles of power lines in low-voltage transformer areas vary greatly in different years and regions. Manually identifying the topology of the low-voltage transformer area is time-consuming and an operation is dangerous. Currently, there are the following two automatic identification manners. (1) Disturbance currents are generated at nodes of the low-voltage transformer area in turn based on a characteristic that the current can only be transmitted in a loop, and current changes of the nodes at a same moment are monitored, where only a node in a same branch loop as the node generating the disturbance current can measure the disturbance current, so that a relationship between the node generating the disturbance current and another node is determined. In this manner, each of the nodes needs to have a capability of sending and monitoring the disturbance current. Consequently, costs are relatively high and universality is poor. Moreover, sending the disturbance current to a power line interferes with a power environment. (2) A power-line carrier (PLC) communication and radio-frequency (RF) communication module is installed at each of the nodes of the low-voltage transformer area, an electricity meter box is identified by adjusting micro-power wireless coverage of the RF communication module, and then big data analysis is performed on an electric energy indication value and active power data of each of the nodes to identify the topology of the low-voltage transformer area. In this manner, all the nodes need to have a PLC and RF dual-mode communication function. Consequently, costs are relatively high and universality is poor. Moreover, the electric energy indication value and the active power data depend on load of a power grid, and an identification result is inaccurate when load of different nodes is similar or there is no load.

SUMMARY

This disclosure provides a method and an apparatus for identifying a topology of a power line low-voltage transformer area, a storage medium, and a computer program.

According to a first aspect, an embodiment of this disclosure provides a method for identifying a topology of a power line low-voltage transformer area, where the low-voltage transformer area includes a plurality of nodes, and the plurality of nodes include a primary node and a plurality of secondary nodes corresponding to the primary node. The method includes: The primary node obtains characteristic data. The characteristic data includes: first characteristic data between any two secondary nodes that have a direct connection relationship in the plurality of secondary nodes in the low-voltage transformer area. The primary node identifies the topology of the low-voltage transformer area based on the characteristic data. The characteristic data includes at least one of delay data or channel quality data, the delay data is a first delay for transmitting information on a power line between the two nodes that have a direct connection relationship, and the channel quality data is quality of a power line channel between the two nodes that have a direct connection relationship.

Based on the foregoing technical solution, the primary node obtains the characteristic data, where the characteristic data includes: the first characteristic data between the any two secondary nodes that have a direct connection relationship in the plurality of secondary nodes in the low-voltage transformer area; and identifies the topology of the low-voltage transformer area based on the characteristic data, where the characteristic data includes at least one of the delay data or the channel quality data. In this way, each node does not need to have a disturbance current sending and monitoring capability or a PLC and RF dual-mode communication function. This greatly reduces a capability requirement on each node. Only a PLC communication module (or a high-speed PLC (HPLC) communication module) commonly configured on each node is used, so that a relatively large workload of replacing the communication module on each node is avoided. Costs are reduced, and universality is high. In addition, the delay data or the channel quality data is data determined based on the power line between the two nodes, and does not depend on load of a power grid, that is, the delay data or the channel quality data is independent of the load of the power grid. In this way, in a case of whether there is load connected to a circuit loop of the two nodes, the delay data or the channel quality data can be obtained by performing PLC communication through the power line between the two nodes. Therefore, the topology of the low-voltage transformer area can still be accurately identified when there is no load or there is only light load on each node, thereby improving identification reliability and accuracy. Moreover, there is no need to send a disturbance current. This avoids interference to a power environment.

In a possible implementation, the characteristic data further includes: second characteristic data between the primary node and a secondary node that is in the low-voltage transformer area and has a direct connection relationship with the primary node. That the primary node obtains characteristic data includes: The primary node sends indication information to a first secondary node, where the indication information indicates the first secondary node to report the characteristic data. The primary node receives the first characteristic data and the second characteristic data that are reported by the first secondary node. Alternatively, the primary node sends indication information to a first secondary node. The primary node receives the first characteristic data reported by the first secondary node. The primary node measures the second characteristic data.

Based on the foregoing technical solution, the primary node may obtain the first characteristic data and the second characteristic data that are measured by the secondary node in the low-voltage transformer area, and the primary node does not need to measure the second characteristic data. This reduces a processing resource of the primary node, and is applicable to a scenario in which the primary node is disposed in a power distribution room and the processing resource is limited. Alternatively, the primary node may obtain the first characteristic data measured by the secondary node in the low-voltage transformer area, and measure the second characteristic data, to fully use a processing resource of the primary node. In this way, the first characteristic data and the second characteristic data are obtained. This is applicable to a scenario in which the primary node is disposed in a power distribution room and has a relatively rich processing resource.

In a possible implementation, at least one physical phase is included between the two nodes that have a direct connection relationship in the low-voltage transformer area, and the characteristic data between the two nodes includes: two pieces of characteristic data that have a same physical phase between the two nodes.

Based on the foregoing technical solution, three phases are usually included for power lines, and the two nodes that have a direct connection relationship may perform PLC communication through a power line of any phase as a channel or through power lines of a plurality of phases as channels. The phase of the power line used for PLC communication between the two nodes is the physical phase between the two nodes. Correspondingly, the characteristic data between the two nodes may be obtained through PLC communication. The phase of the power line used for PLC communication is the physical phase of the characteristic data between the two nodes, and characteristic data obtained by performing PLC communication through power lines of a same phase is characteristic data with the same physical phase. The characteristic data between the two nodes obtained by the primary node may include the characteristic data with the same physical phase between the two nodes. Because the characteristic data with the same physical phase is generated through the power line of the same phase, a length of the power line between the two nodes can be more accurately represented, and accuracy of topology identification of the low-voltage transformer area can be further improved. In addition, the primary node obtains the characteristic data with the same physical phase between the two nodes. This effectively reduces a measurement resource of the characteristic data and further improves efficiency of identifying the topology of the low-voltage transformer area.

In a possible implementation, the method further includes: The primary node obtains electric power data of the nodes in the low-voltage transformer area, where the electric power data includes: at least one of a voltage, a current, power, a power factor, a phase angle, waveform distortion of the voltage, waveform distortion of the current, power frequency, electric energy, a maximum demand, a load record, or an event record collected by the nodes in the low-voltage transformer area at a same network time base (NTB).

Based on the foregoing technical solution, the primary node obtains the electric power data collected by the nodes in the low-voltage transformer area at the same network time base, that is, obtains synchronously collected electric power data. This effectively avoids a time error existing in collecting the electric power data by the nodes, and synchronization, accuracy, and differentiation of the electric power data collected by the nodes are higher.

In a possible implementation, the first delay between the two nodes that have a direct connection relationship in the low-voltage transformer area is determined based on moments at which the two nodes send information, moments at which the two nodes receive information, and internal delays. The two nodes include a first node, the first node is coupled to a first end of the power line, and sends first information and receives second information through the power line, and an internal delay of the first node includes a second delay between a moment at which the first node sends the first information and a moment at which the first information arrives at the first end of the power line, and a third delay between a moment at which the second information arrives at the first end of the power line and a moment at which the first node receives the second information.

Based on the foregoing technical solution, the moments at which the two nodes that have a direct connection relationship send information, the moments at which the two nodes receive information, and the internal delays are used to determine the first delay between the two nodes, so that impact of a delay difference between information sending and receiving by different nodes on measuring the first delay is fully considered, thereby improving accuracy of the measured first delay.

In a possible implementation, that the primary node measures the second characteristic data includes: The primary node sends a first packet to a target secondary node that is in the low-voltage transformer area and that has a direct connection relationship with the primary node, and determines a moment at which the first packet is sent. The primary node receives a second packet sent by the target secondary node, and determines a moment at which the second packet is received, where the second packet includes an internal delay of the target secondary node, a moment at which the target secondary node receives the first packet, and a moment at which the target secondary node sends the second packet. The primary node determines a first delay between the primary node and the target secondary node based on the moment at which the primary node sends the first packet, the moment at which the primary node receives the second packet, the moment at which the target secondary node receives the first packet, the moment at which the target secondary node sends the second packet, the internal delay of the target secondary node, and an internal delay of the primary node.

Based on the foregoing technical solution, the first packet and the second packet may be dedicated packets used to measure the delay data, and sufficient resources of the dedicated packets may carry data such as the moments for receiving and sending the packets and the internal delays that are determined by the primary node and the target secondary node. The primary node can obtain the data required for measuring the first delay provided that one round of communication is performed between the primary node and the target secondary node by using the first packet and the second packet, so that the first delay between the primary node and the target secondary node can be determined, thereby improving measurement efficiency.

In a possible implementation, that the primary node measures the second characteristic data includes: The primary node sends a first packet to a target secondary node, and determines a moment at which the first packet is sent. The primary node receives a third packet sent by the target secondary node, and determines a moment at which the third packet is received. The primary node sends a fourth packet to the target secondary node. The primary node receives a fifth packet sent by the target secondary node, where the fifth packet includes: an internal delay of the target secondary node, a moment at which the target secondary node receives the first packet, and a moment at which the target secondary node sends the third packet. The primary node determines a first delay between the primary node and the target secondary node based on the moment at which the primary node sends the first packet, the moment at which the primary node receives the third packet, an internal delay of the primary node, the internal delay of the target secondary node, the moment at which the target secondary node receives the first packet, and the moment at which the target secondary node sends the third packet.

Based on the foregoing technical solution, in a process in which the primary node and the target secondary node communicates with each other by using the first packet and the third packet, the target secondary node locally stores the moment of receiving the first packet, the moment of sending the third packet, and the internal delay of the target secondary node that are determined, and further the data is reported to the primary node by using the fifth packet, so that the primary node obtains the data required for measuring the first delay. Existing packets may be reused as the first packet, the third packet, the fourth packet, and the fifth packet, so that remaining resources of the existing packets are fully utilized, and new packets do not need to be separately provided, thereby improving universality of a measurement manner. Alternatively, short frame packets may be used as the first packet and the third packet. This effectively reduces a resource occupied in a measurement process.

In a possible implementation, that the primary node measures the second characteristic data includes: The primary node sends a first packet to a target secondary node, and determines a moment at which the first packet is sent. The primary node receives a sixth packet sent by the target secondary node, and determines a moment at which the sixth packet is received, where the sixth packet includes first delay data, and the first delay data includes some data of an internal delay of the target secondary node, a moment at which the target secondary node receives the first packet, and a moment at which the target secondary node sends the sixth packet. The primary node sends a seventh packet to the target secondary node. The primary node receives an eighth packet sent by the target secondary node, where the eighth packet includes second delay data, and the second delay data is other data other than the first delay data in the internal delay of the target secondary node, the moment at which the target secondary node receives the first packet, and the moment at which the target secondary node sends the sixth packet. The primary node determines a first delay between the primary node and the target secondary node based on the moment at which the primary node sends the first packet, the moment at which the primary node receives the sixth packet, an internal delay of the primary node, the internal delay of the target secondary node, the moment at which the target secondary node receives the first packet, and the moment at which the target secondary node sends the sixth packet.

Based on the foregoing technical solution, the target secondary node reports, to the primary node by using the sixth packet and the eighth packet, the moment of receiving the first packet, the moment of sending the third packet, and the internal delay of the target secondary node that are determined, so that the primary node obtains data required for measuring the first delay, and determines the first delay between the primary node and the target secondary node, where the first packet, the sixth packet, the seventh packet, and the eighth packet may be each provided by reusing an existing packet, so that a remaining resource of the existing packet is fully utilized, and a new packet does not need to be separately provided, thereby improving universality of a measurement manner. Alternatively, short frame packets may be used for the first packet, the sixth packet, the seventh packet, and the eighth packet. This effectively reduces a resource occupied in a measurement process.

In a possible implementation, the method further includes: The primary node performs cluster analysis based on at least one of the delay data or the channel quality data, to determine at least one cluster, where delay data between nodes in a same cluster meets a first preset condition, and/or channel quality data between the nodes in the same cluster meets a second preset condition. The primary node determines a connection relationship between different clusters based on the delay data and the at least one cluster. The primary node determines a node connection relationship between any two directly connected clusters based on the electric power data and the connection relationship between the different clusters. The primary node determines a connection relationship between nodes in each cluster based on the electric power data. The primary node identifies the topology of the low-voltage transformer area based on the connection relationship between the different clusters, the connection relationship between the nodes in each cluster, and the node connection relationship between the any two directly connected clusters.

Based on the foregoing technical solution, the cluster analysis is performed based on at least one of the delay data or the channel quality data, to determine the cluster in the low-voltage transformer area. Further, the connection relationship between the different clusters is determined based on the delay data, and the node connection relationship between the two directly connected clusters and the connection relationship between the nodes in each cluster are determined based on the electric power data, to identify the topology of the low-voltage transformer area. The electric power data may be electric power data collected by the nodes at a same network time base, and the electric power data has high synchronization, accuracy, and differentiation, so that the node connection relationship between the two directly connected clusters and the connection relationship between the nodes in each cluster can be more accurately determined, thereby further improving accuracy of topology identification of the low-voltage transformer area.

In a possible implementation, that the primary node determines a connection relationship between different clusters based on the delay data and the at least one cluster includes: The primary node performs statistical analysis based on the delay data, to determine a distance between the different clusters. The primary node uses the distance between the different clusters as an input variable of a minimum spanning tree algorithm, to obtain the connection relationship between the different clusters.

Based on the foregoing technical solution, the statistical analysis is performed based on the delay data to determine the distance between the different clusters, and the distance between the different clusters is used as the input variable of the minimum spanning tree algorithm. In this way, the connection relationship between the different clusters can be quickly and accurately obtained.

In a possible implementation, the method further includes: The primary node performs data analysis on at least one of the delay data, the channel quality data, or the electric power data by using an intelligent algorithm, to identify the topology of the low-voltage transformer area, where the intelligent algorithm includes: at least one of an artificial neural network algorithm, a genetic algorithm, a simulated annealing algorithm, an ant colony algorithm, or a particle swarm optimization algorithm.

Based on the foregoing technical solution, the intelligent algorithm may be used to perform the data analysis on the at least one of the delay data, the channel quality data, or the electric power data, to identify the topology of the low-voltage transformer area.

In a possible implementation, the channel quality data further includes: quality of a radio channel between the two nodes that have a direct connection relationship in the low-voltage transformer area.

Based on the foregoing technical solution, the quality of the radio channel may represent a spatial linear distance between the two nodes, and the quality of the power line channel may represent a length of the power line between the two nodes. Therefore, the quality of the power line channel may be corrected based on the quality of the radio channel. For example, if the spatial distance between the two nodes that is represented by the quality of the radio channel between the two nodes is greater than the length of the power line between the two nodes that is represented by the quality of the power line channel between the two nodes, the quality of the power line channel may be inaccurate. For another example, if the spatial distance between the two nodes that is represented by the quality of the radio channel between the two nodes is smaller, but the length of the power line between the two nodes that is represented by the quality of the power line channel between the two nodes is larger, the quality of the power line channel may be inaccurate. In this way, a wireless communication function between nodes can be fully utilized to obtain the quality of the radio channel between the any two secondary nodes that have a direct connection relationship. In this way, the quality of the power line channel can be corrected, so that accuracy of the quality of the power line channel is higher. Further, a connection relationship between the secondary nodes in the low-voltage transformer area can be more accurately determined, so that accuracy of topology identification of the low-voltage transformer area is further improved.

In a possible implementation, the first characteristic data reported by the first secondary node includes: a first delay for transmitting information through a power line between the first secondary node and a second secondary node that has a direct connection relationship with the first secondary node and that is in the low-voltage transformer area, and quality of a power line channel between the first secondary node and the second secondary node.

In a possible implementation, the channel quality data includes: at least one of a signal attenuation value, signal strength, or a signal-to-noise ratio.

According to a second aspect, an embodiment of this disclosure provides a method for identifying a topology of a power line low-voltage transformer area, where the low-voltage transformer area includes a plurality of nodes, the plurality of nodes include a primary node and a plurality of secondary nodes corresponding to the primary node, and the plurality of secondary nodes include a first secondary node. The method includes: The first secondary node receives indication information sent by the primary node. The first secondary node reports characteristic data in response to the indication information, where the characteristic data includes: first characteristic data between any two secondary nodes that have a direct connection relationship in the plurality of secondary nodes in the low-voltage transformer area. The characteristic data is used by the primary node to identify the topology of the low-voltage transformer area. The characteristic data includes at least one of delay data or channel quality data, the delay data is a first delay for transmitting information on a power line between the two nodes that have a direct connection relationship, and the channel quality data is quality of a power line channel between the two nodes that have a direct connection relationship.

Based on the foregoing technical solution, the characteristic data reported by the first secondary node includes: the first characteristic data between the any two secondary nodes that have a direct connection relationship in the plurality of secondary nodes in the low-voltage transformer area; the characteristic data is used by the primary node to identify the topology of the low-voltage transformer area; and the characteristic data includes at least one of the delay data or the channel quality data. In this way, each node does not need to have a disturbance current sending and monitoring capability or a PLC and RF dual-mode communication function. This greatly reduces a capability requirement on each node. Only a PLC communication module (or an HPLC communication module) that has been widely configured in each node is used, so that a relatively large workload of replacing the communication module in each node is avoided. Costs are reduced, and universality is high. In addition, the delay data or the channel quality data is data determined based on the power line between the two nodes, and does not depend on load of a power grid, that is, the delay data or the channel quality data is independent of the load of the power grid. In this way, in a case of whether there is load connected to a circuit loop of the two nodes, the delay data or the channel quality data can be obtained by performing PLC communication through the power line between the two nodes, so that the primary node can still accurately identify the topology of the low-voltage transformer area when there is no load or there is only light load on each node, thereby improving identification reliability and accuracy. Moreover, there is no need to send a disturbance current. This avoids interference to a power environment.

In a possible implementation, the characteristic data further includes: second characteristic data between the primary node and a secondary node that is in the low-voltage transformer area and that has a direct connection relationship with the primary node.

Based on the foregoing technical solution, the first secondary node may report the first characteristic data and the second characteristic data, so that the primary node does not need to measure the second characteristic data, thereby reducing a processing resource of the primary node. This is applicable to a scenario in which the primary node is disposed in a power distribution room and the processing resource is limited.

In a possible implementation, at least one physical phase is included between the two nodes that have a direct connection relationship in the low-voltage transformer area, and the characteristic data between the two nodes includes: two pieces of characteristic data that have a same physical phase between the two nodes.

Based on the foregoing technical solution, three phases are usually included for power lines, and the two nodes that have a direct connection relationship may perform PLC communication through a power line of any phase as a channel or through power lines of a plurality of phases as channels. The phase of the power line used for PLC communication between the two nodes is the physical phase between the two nodes. Correspondingly, the characteristic data between the two nodes may be obtained through PLC communication. The phase of the power line used for PLC communication is the physical phase of the characteristic data between the two nodes, and characteristic data obtained by performing PLC communication through power lines of a same phase is characteristic data with the same physical phase. The characteristic data between the two nodes obtained by the primary node may include the characteristic data with the same physical phase between the two nodes. Because the characteristic data with the same physical phase is generated through the power line of the same phase, a length of the power line between the two nodes can be more accurately represented, and accuracy of topology identification of the low-voltage transformer area can be further improved. The characteristic data between the two nodes includes the characteristic data with the same physical phase between the two nodes. This effectively reduces a measurement resource of the characteristic data and further improves efficiency of identifying the topology of the low-voltage transformer area.

In a possible implementation, the method further includes: The first secondary node reports electric power data in response to the indication information, where the electric power data includes: at least one of a voltage, a current, power, a power factor, a phase angle, waveform distortion of the voltage, waveform distortion of the current, power frequency, electric energy, a maximum demand, a load record, or an event record collected by the first secondary node at a preset network time base.

Based on the foregoing technical solution, the first secondary node collects the electric power data at the preset network time base. In this way, the nodes in the low-voltage transformer area may collect the electric power data at the same network time base, to implement synchronous collection of the electric power data in the low-voltage transformer area. This effectively avoids a time error existing in collecting the electric power data by the nodes, and synchronization, accuracy, and differentiation of the electric power data collected by the nodes are higher.

In a possible implementation, the first delay between the two nodes that have a direct connection relationship in the low-voltage transformer area is determined based on moments at which the two nodes send information, moments at which the two nodes receive information, and internal delays. When the two nodes include a first node, and the first node is coupled to a first end of the power line, and sends first information and receives second information through the power line, an internal delay of the first node includes a second delay between a moment at which the first node sends the first information and a moment at which the first information arrives at the first end of the power line, and a third delay between a moment at which the second information arrives at the first end of the power line and a moment at which the first node receives the second information.

Based on the foregoing technical solution, the moments at which the two nodes that have a direct connection relationship send information, the moments at which the two nodes receive information, and the internal delays are used to determine the first delay between the two nodes, so that impact of a delay difference between information sending and receiving by different nodes on measuring the first delay is fully considered, thereby improving accuracy of the measured first delay.

In a possible implementation, the method further includes: The first secondary node sends a first packet to a target node that is in the low-voltage transformer area and that has a direct connection relationship with the first secondary node, and determines a moment at which the first packet is sent. The first secondary node receives a second packet sent by the target node, and determines a moment at which the second packet is received, where the second packet includes an internal delay of the target node, a moment at which the target node receives the first packet, and a moment at which the target node sends the second packet. The first secondary node determines a first delay between the first secondary node and the target node based on the moment at which the first secondary node sends the first packet, the moment at which the first secondary node receives the second packet, the moment at which the target node receives the first packet, the moment at which the target node sends the second packet, the internal delay of the target node, and the internal delay of the first secondary node.

Based on the foregoing technical solution, the first packet and the second packet may be dedicated packets used to measure the delay data, and sufficient resources of the dedicated packets may carry data such as the moments for receiving and sending the packets and the internal delays that are determined by the first secondary node and the target node. The first secondary node can obtain data required for measuring the first delay provided that one round of communication is performed between the first secondary node and the target node by using the first packet and the second packet, so that the first delay between the first secondary node and the target node can be determined, thereby improving measurement efficiency.

In a possible implementation, the method further includes: The first secondary node sends a first packet to a target node, and determines a moment at which the third packet is sent. The first secondary node receives the third packet sent by the target node, and determines a moment at which the third packet is received. The first secondary node sends a fourth packet to the target node. The first secondary node receives a fifth packet sent by the target node, where the fifth packet includes: an internal delay of the target node, a moment at which the target node receives the first packet, and a moment at which the target node sends the third packet. The first secondary node determines a first delay between the first secondary node and the target node based on the moment at which the first secondary node sends the first packet, the moment at which the first secondary node receives the third packet, an internal delay of the first secondary node, the internal delay of the target node, the moment at which the target node receives the first packet, and the moment at which the target node sends the third packet.

Based on the foregoing technical solution, in a process in which the first secondary node and the target node communicates with each other by using the first packet and the third packet, the target node locally stores the moment of receiving the first packet, the moment of sending the third packet, and the internal delay of the target node that are determined, and further the data is reported to the first secondary node by using the fifth packet, so that the first secondary node obtains the data required for measuring the first delay. Existing packets may be reused as the first packet, the third packet, the fourth packet, and the fifth packet, so that remaining resources of the existing packets are fully utilized, and new packets do not need to be separately provided, thereby improving universality of a measurement manner. Alternatively, short frame packets may be used as the first packet and the third packet. This effectively reduces a resource occupied in a measurement process.

In a possible implementation, the method further includes: The first secondary node sends a first packet to the target node, and determines a moment at which the first packet is sent. The first secondary node receives a sixth packet sent by the target node, and determines a moment at which the sixth packet is received, where the sixth packet includes first delay data, and the first delay data includes some data of an internal delay of the target node, a moment at which the target node receives the first packet, and a moment at which the target node sends the sixth packet. The first secondary node sends a seventh packet to the target node. The first secondary node receives an eighth packet sent by the target node, where the eighth packet includes second delay data, and the second delay data is other data other than the first delay data in the internal delay of the target node, the moment at which the target node receives the first packet, and the moment at which the target node sends the sixth packet. The first secondary node determines a first delay between the first secondary node and the target node based on the moment at which the first secondary node sends the first packet, the moment at which the first secondary node receives the sixth packet, an internal delay of the first secondary node, the internal delay of the target node, the moment at which the target node receives the first packet, and the moment at which the target node sends the sixth packet.

Based on the foregoing technical solution, the target node reports, to the first secondary node by using the sixth packet and the eighth packet, the moment of receiving the first packet, the moment of sending the third packet, and the internal delay of the target node that are determined, so that the first secondary node obtains data required for measuring the first delay, and determines the first delay between the first secondary node and the target node, where the first packet, the sixth packet, the seventh packet, and the eighth packet may be each provided by reusing an existing packet, so that a remaining resource of the existing packet is fully utilized, and a new packet does not need to be separately provided, thereby improving universality of a measurement manner. Alternatively, short frame packets may be used for the first packet, the sixth packet, the seventh packet, and the eighth packet. This effectively reduces a resource occupied in a measurement process.

In a possible implementation, the channel quality data further includes: quality of a radio channel between the two nodes that have a direct connection relationship in the low-voltage transformer area.

Based on the foregoing technical solution, the quality of the radio channel may represent a spatial straight-line distance between the two nodes, and the quality of the power line channel may represent a length of the power line between the two nodes. Therefore, the quality of the power line channel may be corrected based on the quality of the radio channel. For example, if the spatial distance between the two nodes that is represented by the quality of the radio channel between the two nodes is greater than the length of the power line between the two nodes that is represented by the quality of the power line channel between the two nodes, the quality of the power line channel may be inaccurate. For another example, if the spatial distance between the two nodes that is represented by the quality of the radio channel between the two nodes is smaller, but the length of the power line between the two nodes that is represented by the quality of the power line channel between the two nodes is larger, the quality of the power line channel may be inaccurate. In this way, a wireless communication function between nodes can be fully utilized, so that the primary node more accurately determines, by using quality of a radio channel between any two secondary nodes that have a direct connection relationship, a connection relationship between the secondary nodes in the low-voltage transformer area, thereby further improving accuracy of topology identification of the low-voltage transformer area.

In a possible implementation, the characteristic data reported by the first secondary node includes: a first delay for transmitting information through a power line between the first secondary node and a second secondary node that has a direct connection relationship with the first secondary node and that is in the low-voltage transformer area, and quality of a power line channel between the first secondary node and the second secondary node.

In a possible implementation, the channel quality data includes: at least one of a signal attenuation value, signal strength, or a signal-to-noise ratio.

According to a third aspect, an embodiment of this disclosure provides an apparatus for identifying a topology of a power line low-voltage transformer area, where the low-voltage transformer area includes a plurality of nodes, and the plurality of nodes include a primary node and a plurality of secondary nodes corresponding to the primary node. The apparatus includes: an obtaining module, configured to obtain characteristic data, where the characteristic data includes: first characteristic data between any two secondary nodes that have a direct connection relationship in the plurality of secondary nodes in the low-voltage transformer area; and an identification module, configured to identify the topology of the low-voltage transformer area based on the characteristic data, where the characteristic data includes at least one of delay data or channel quality data, the delay data is a first delay for transmitting information on a power line between the two nodes that have a direct connection relationship, and the channel quality data is quality of a power line channel between the two nodes that have a direct connection relationship.

In a possible implementation, the characteristic data further includes: second characteristic data between the primary node and a secondary node that is in the low-voltage transformer area and has a direct connection relationship with the primary node. The obtaining module is further configured to: send indication information to a first secondary node, where the indication information indicates the first secondary node to report the characteristic data; and receive the first characteristic data and the second characteristic data that are reported by the first secondary node; or send the indication information to the first secondary node; receive the first characteristic data reported by the first secondary node; and measure the second characteristic data.

In a possible implementation, at least one physical phase is included between the two nodes that have a direct connection relationship in the low-voltage transformer area, and the characteristic data between the two nodes includes: two pieces of characteristic data that have a same physical phase between the two nodes.

In a possible implementation, the obtaining module is further configured to: obtain electric power data of the nodes in the low-voltage transformer area, where the electric power data includes: at least one of a voltage, a current, power, a power factor, a phase angle, waveform distortion of the voltage, waveform distortion of the current, power frequency, electric energy, a maximum demand, a load record, or an event record collected by the nodes in the low-voltage transformer area at a same network time base NTB.

In a possible implementation, the first delay between the two nodes that have a direct connection relationship in the low-voltage transformer area is determined based on moments at which the two nodes send information, moments at which the two nodes receive information, and internal delays. The two nodes include a first node, the first node is coupled to a first end of the power line, and sends first information and receives second information through the power line, and an internal delay of the first node includes a second delay between a moment at which the first node sends the first information and a moment at which the first information arrives at the first end of the power line, and a third delay between a moment at which the second information arrives at the first end of the power line and a moment at which the first node receives the second information.

In a possible implementation, the obtaining module is further configured to: send, by the primary node, a first packet to a target secondary node that is in the low-voltage transformer area and that has a direct connection relationship with the primary node, and determine a moment at which the first packet is sent; receive, by the primary node, a second packet sent by the target secondary node, and determine a moment at which the second packet is received, where the second packet includes an internal delay of the target secondary node, a moment at which the target secondary node receives the first packet, and a moment at which the target secondary node sends the second packet; and determine, by the primary node, a first delay between the primary node and the target secondary node based on the moment at which the primary node sends the first packet, the moment at which the primary node receives the second packet, the moment at which the target secondary node receives the first packet, the moment at which the target secondary node sends the second packet, the internal delay of the target secondary node, and an internal delay of the primary node.

In a possible implementation, the obtaining module is further configured to: send, by the primary node, a first packet to a target secondary node, and determine a moment at which the first packet is sent; receive, by the primary node, a third packet sent by the target secondary node, and determine a moment at which the third packet is received; send, by the primary node, a fourth packet to the target secondary node; receive, by the primary node, a fifth packet sent by the target secondary node, where the fifth packet includes: an internal delay of the target secondary node, a moment at which the target secondary node receives the first packet, and a moment at which the target secondary node sends the third packet; and determine, by the primary node, a first delay between the primary node and the target secondary node based on the moment at which the primary node sends the first packet, the moment at which the primary node receives the third packet, an internal delay of the primary node, the internal delay of the target secondary node, the moment at which the target secondary node receives the first packet, and the moment at which the target secondary node sends the third packet.

In a possible implementation, the obtaining module is further configured to: send, by the primary node, a first packet to a target secondary node, and determine a moment at which the first packet is sent; receive, by the primary node, a sixth packet sent by the target secondary node, and determine a moment at which the sixth packet is received, where the sixth packet includes first delay data, and the first delay data includes some data of an internal delay of the target secondary node, a moment at which the target secondary node receives the first packet, and a moment at which the target secondary node sends the sixth packet; send, by the primary node, a seventh packet to the target secondary node; receive, by the primary node, an eighth packet sent by the target secondary node, where the eighth packet includes second delay data, and the second delay data is other data other than the first delay data in the internal delay of the target secondary node, the moment at which the target secondary node receives the first packet, and the moment at which the target secondary node sends the sixth packet; and determine, by the primary node, a first delay between the primary node and the target secondary node based on the moment at which the primary node sends the first packet, the moment at which the primary node receives the sixth packet, an internal delay of the primary node, the internal delay of the target secondary node, the moment at which the target secondary node receives the first packet, and the moment at which the target secondary node sends the sixth packet.

In a possible implementation, the identification module is further configured to: perform cluster analysis based on at least one of the delay data or the channel quality data, to determine at least one cluster, where delay data between nodes in a same cluster meets a first preset condition, and/or channel quality data between the nodes in the same cluster meets a second preset condition; determine a connection relationship between different clusters based on the delay data and the at least one cluster; determine a node connection relationship between any two directly connected clusters based on the electric power data and the connection relationship between the different clusters; determine a connection relationship between nodes in each cluster based on the electric power data; and identify the topology of the low-voltage transformer area based on the connection relationship between the different clusters, the connection relationship between the nodes in each cluster, and the node connection relationship between the any two directly connected clusters.

In a possible implementation, the identification module is further configured to: perform statistical analysis based on the delay data, to determine a distance between the different clusters; and use the distance between the different clusters as an input variable of a minimum spanning tree algorithm, to obtain the connection relationship between the different clusters.

In a possible implementation, the identification module is further configured to: perform data analysis on at least one of the delay data, the channel quality data, or the electric power data by using an intelligent algorithm, to identify the topology of the low-voltage transformer area, where the intelligent algorithm includes: at least one of an artificial neural network algorithm, a genetic algorithm, a simulated annealing algorithm, an ant colony algorithm, or a particle swarm optimization algorithm.

In a possible implementation, the channel quality data further includes: quality of a radio channel between the two nodes that have a direct connection relationship in the low-voltage transformer area.

In a possible implementation, the first characteristic data reported by the first secondary node includes: a first delay for transmitting information through a power line between the first secondary node and a second secondary node that has a direct connection relationship with the first secondary node and that is in the low-voltage transformer area, and quality of a power line channel between the first secondary node and the second secondary node.

For technical effects of the third aspect and the possible implementations of the third aspect, refer to the technical effects of the first aspect and the possible implementations of the first aspect.

According to a fourth aspect, an embodiment of this disclosure provides an apparatus for identifying a topology of a power line low-voltage transformer area, where the low-voltage transformer area includes a plurality of nodes, the plurality of nodes include a primary node and a plurality of secondary nodes corresponding to the primary node, and the plurality of secondary nodes include a first secondary node. The apparatus includes: a receiving module, configured to receive indication information sent by the primary node; and a reporting module, configured to report characteristic data in response to the indication information, where the characteristic data includes: first characteristic data between any two secondary nodes that have a direct connection relationship in the plurality of secondary nodes in the low-voltage transformer area. The characteristic data is used by the primary node to identify the topology of the low-voltage transformer area. The characteristic data includes at least one of delay data or channel quality data, the delay data is a first delay for transmitting information on a power line between the two nodes that have a direct connection relationship, and the channel quality data is quality of a power line channel between the two nodes that have a direct connection relationship.

In a possible implementation, the characteristic data further includes: second characteristic data between the primary node and a secondary node that is in the low-voltage transformer area and that has a direct connection relationship with the primary node.

In a possible implementation, in a second possible implementation of the fourth aspect, at least one physical phase is included between the two nodes that have a direct connection relationship in the low-voltage transformer area, and the characteristic data between the two nodes includes: two pieces of characteristic data that have a same physical phase between the two nodes.

In a possible implementation, the reporting module is further configured to: report electric power data in response to the indication information, where the electric power data includes: at least one of a voltage, a current, power, a power factor, a phase angle, waveform distortion of the voltage, waveform distortion of the current, power frequency, electric energy, a maximum demand, a load record, or an event record collected by the first secondary node at a preset network time base NTB.

In a possible implementation, the first delay between the two nodes that have a direct connection relationship in the low-voltage transformer area is determined based on moments at which the two nodes send information, moments at which the two nodes receive information, and internal delays. When the two nodes include a first node, and the first node is coupled to a first end of the power line, and sends first information and receives second information through the power line, an internal delay of the first node includes a second delay between a moment at which the first node sends the first information and a moment at which the first information arrives at the first end of the power line, and a third delay between a moment at which the second information arrives at the first end of the power line and a moment at which the first node receives the second information.

In a possible implementation, the apparatus further includes a measurement module, configured to: send, by the first secondary node, a first packet to a target node that is in the low-voltage transformer area and that has a direct connection relationship with the first secondary node, and determine a moment at which the first packet is sent; receive, by the first secondary node, a second packet sent by the target node, and determine a moment at which the second packet is received, where the second packet includes an internal delay of the target node, a moment at which the target node receives the first packet, and a moment at which the target node sends the second packet; and determine, by the first secondary node, a first delay between the first secondary node and the target node based on the moment at which the first secondary node sends the first packet, the moment at which the first secondary node receives the second packet, the moment at which the target node receives the first packet, the moment at which the target node sends the second packet, the internal delay of the target node, and the internal delay of the first secondary node.

In a possible implementation, the measurement module is further configured to: send, by the first secondary node, a first packet to a target node, and determine a moment at which the third packet is sent; receive, by the first secondary node, the third packet sent by the target node, and determine a moment at which the third packet is received; send, by the first secondary node, a fourth packet to the target node; receive, by the first secondary node, a fifth packet sent by the target node, where the fifth packet includes: an internal delay of the target node, a moment at which the target node receives the first packet, and a moment at which the target node sends the third packet; and determine, by the first secondary node, a first delay between the first secondary node and the target node based on the moment at which the first secondary node sends the first packet, the moment at which the first secondary node receives the third packet, an internal delay of the first secondary node, the internal delay of the target node, the moment at which the target node receives the first packet, and the moment at which the target node sends the third packet.

In a possible implementation, the measurement module is further configured to: send, by the first secondary node, a first packet to a target node, and determine a moment at which the first packet is sent; receive, by the first secondary node, a sixth packet sent by the target node, and determine a moment at which the sixth packet is received, where the sixth packet includes first delay data, and the first delay data includes some data of an internal delay of the target node, a moment at which the target node receives the first packet, and a moment at which the target node sends the sixth packet; send, by the first secondary node, a seventh packet to the target node; receive, by the first secondary node, an eighth packet sent by the target node, where the eighth packet includes second delay data, and the second delay data is other data other than the first delay data in the internal delay of the target node, the moment at which the target node receives the first packet, and the moment at which the target node sends the sixth packet; and determine, by the first secondary node, a first delay between the first secondary node and the target node based on the moment at which the first secondary node sends the first packet, the moment at which the first secondary node receives the sixth packet, an internal delay of the first secondary node, the internal delay of the target node, the moment at which the target node receives the first packet, and the moment at which the target node sends the sixth packet.

In a possible implementation, the channel quality data further includes: quality of a radio channel between the two nodes that have a direct connection relationship in the low-voltage transformer area.

In a possible implementation, the characteristic data reported by the first secondary node includes: a first delay for transmitting information through a power line between the first secondary node and a second secondary node that has a direct connection relationship with the first secondary node and that is in the low-voltage transformer area, and quality of a power line channel between the first secondary node and the second secondary node.

In a possible implementation, the channel quality data includes: at least one of a signal attenuation value, signal strength, or a signal-to-noise ratio.

For technical effects of the fourth aspect and the possible implementations of the fourth aspect, refer to the technical effects of the second aspect and the possible implementations of the second aspect.

According to a fifth aspect, an embodiment of this disclosure provides an apparatus for identifying a topology of a power line low-voltage transformer area, including: a processor and a transmission interface, where the processor receives or sends data through the transmission interface. When executing instructions stored in a memory, the processor is configured to implement the method for identifying a topology of a power line low-voltage transformer area according to one or more of the first aspect or the plurality of possible implementations of the first aspect, or implement the method for identifying a topology of a power line low-voltage transformer area according to one or more of the second aspect or the plurality of possible implementations of the second aspect.

For technical effects of the fifth aspect, refer to the technical effects of the first aspect and the possible implementations of the first aspect, or the technical effects of the second aspect and the possible implementations of the second aspect.

According to a sixth aspect, an embodiment of this disclosure provides a computer-readable storage medium, where the computer-readable storage medium stores computer program instructions. When the computer program instructions are executed by a computer or a processor, the method for identifying a topology of a power line low-voltage transformer area according to one or more of the first aspect or the plurality of possible implementations of the first aspect is implemented, or the method for identifying a topology of a power line low-voltage transformer area according to one or more of the second aspect or the plurality of possible implementations of the second aspect is implemented.

For technical effects of the sixth aspect, refer to the technical effects of the first aspect and the possible implementations of the first aspect, or the technical effects of the second aspect and the possible implementations of the second aspect.

According to a seventh aspect, an embodiment of this disclosure provides a computer program product including instructions. When the instructions run on a computer or a processor, the computer or the processor is enabled to perform the method for identifying a topology of a power line low-voltage transformer area according to one or more of the first aspect or the plurality of possible implementations of the first aspect, or perform the method for identifying a topology of a power line low-voltage transformer area according to one or more of the second aspect or the plurality of possible implementations of the second aspect.

For technical effects of the seventh aspect, refer to the technical effects of the first aspect and the possible implementations of the first aspect, or the technical effects of the second aspect and the possible implementations of the second aspect.

DESCRIPTION OF EMBODIMENTS

Figure 1:
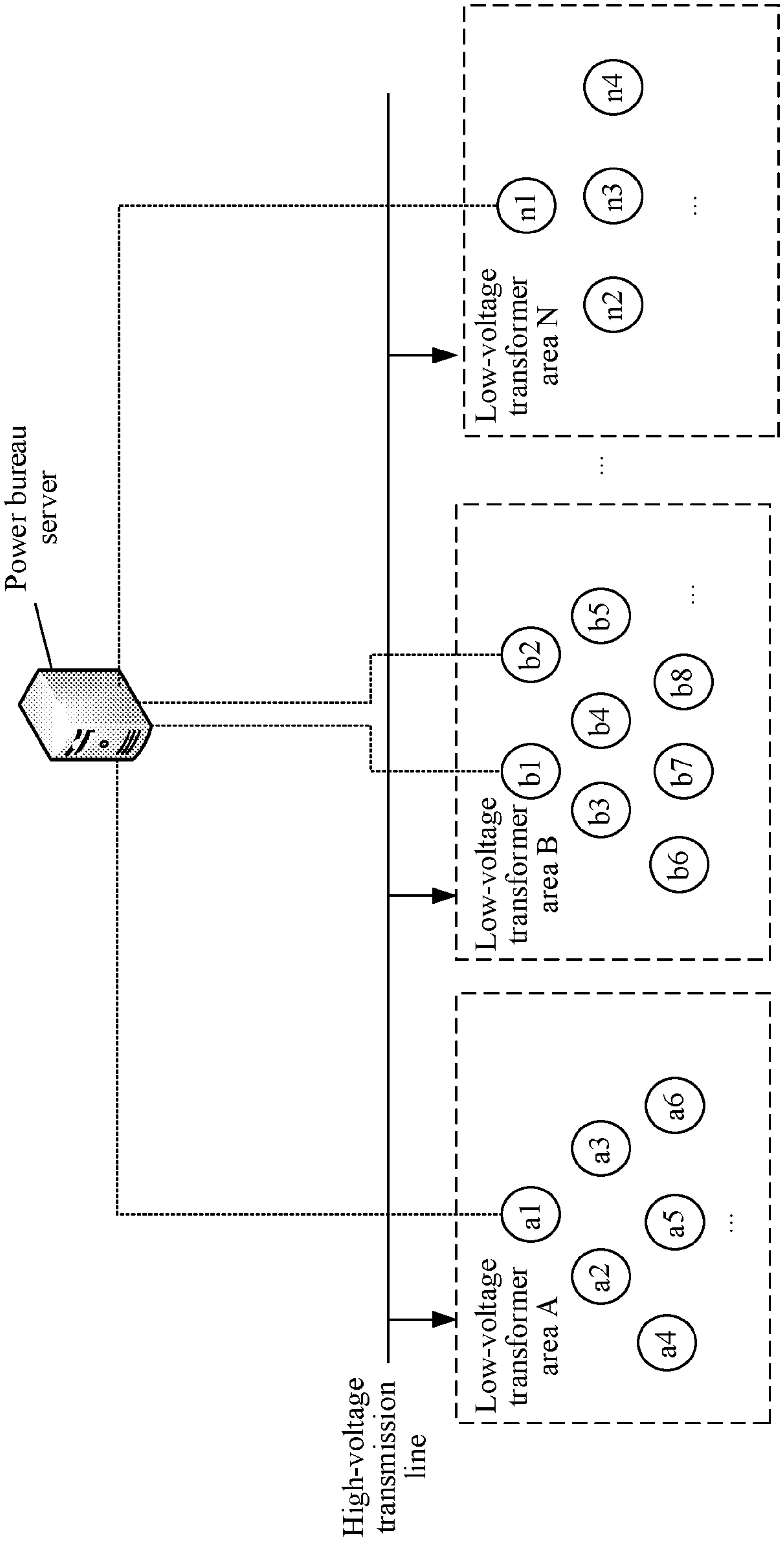
FIG. 1 is a schematic diagram of low-voltage transformer area distribution according to an embodiment of this disclosure.

Various example embodiments, features, and aspects of this disclosure are described in detail below with reference to the accompanying drawings. Identical reference numerals in the accompanying drawings indicate elements that have same or similar functions. Although various aspects of the embodiments are shown in the accompanying drawings, it is not necessary to draw the accompanying drawings to scale unless otherwise stated.

The term "exemplary" specifically used herein means "as an example, an embodiment, or an illustration". Any embodiment illustrated herein as "exemplary" need not be construed as superior to or better than other embodiments.

It should be understood that, in this disclosure, "at least one" means one or more, and "a plurality of" means two or more. The term "and/or" is used to describe an association relationship for describing associated objects, and represents that three relationships may exist. For example, "A and/or B" may indicate: Only A exists, only B exists, and both A and B exist, where A and B may be singular or plural. The character "/" generally indicates an "or" relationship between the associated objects. "At least one (item) of the following" or a similar expression thereof indicates any combination of the following, including any combination of one (item) or more (items) of the following. For example, at least one (item) of a, b, or c may represent: a, b, c, "a and b", "a and c", "b and c", or "a, b, and c", where a, b, and c may be a single item or a plurality of items.

In addition, to better describe this disclosure, numerous specific details are provided in the following specific implementations. A person skilled in the art should understand that this disclosure may also be implemented without specific details. In some instances, methods, means, elements, and circuits that are well-known to a person skilled in the art are not described in detail, so that the subject matter of this disclosure is highlighted.

To facilitate understanding of the embodiments of this disclosure, the following first describes disclosure scenarios to which the technical solutions provided in the embodiments of this disclosure are applicable.

FIG. 1 is a schematic diagram of low-voltage transformer area distribution according to an embodiment of this disclosure. High-voltage power on a high-voltage transmission line is converted into low-voltage power through a transformer. Low-voltage transformer areas, namely, a low-voltage transformer area A, a low-voltage transformer area B, . . . , a low-voltage transformer area N, and the like, of different transformers are shown in FIG. 1. Each low-voltage transformer area may include a plurality of nodes, and a quantity of nodes in different low-voltage transformer areas may be different. For example, nodes in the low-voltage transformer area A may include a1, a2, a3, a4, . . . , nodes in the low-voltage transformer area B may include b1, b2, b3, b4, b5, . . . , and nodes in the low-voltage transformer area N may include n1, n2, n3, . . .

The nodes in the low-voltage transformer area may be classified into primary nodes and secondary nodes. As a general agent of each low-voltage transformer area, the primary node may be disposed in a power distribution room, communicates with a power bureau server through an optical fiber private network/wireless public network, and is controlled and monitored by the power bureau server. The primary node may communicate with each secondary node corresponding to the primary node in the low-voltage transformer area through a PLC network (or PLC and RF), to control and monitor the secondary node in the low-voltage transformer area. The primary node may collect data reported by the secondary node, and has a capability of processing the collected data. Further, the primary node may further have a capability of collecting data such as electric energy, power, a voltage, and a current. For example, the primary node may include a convergence terminal, also referred to as a concentrator, an energy controller, an intelligent distribution transformer terminal, or the like, and may further include a module or apparatus that has a function of the primary node, for example, a PLC communication module (or a PLC and RF dual-mode communication module) that has a specific data processing capability, a PLC communication module (or a PLC and RF dual-mode communication module) that has a specific data processing capability and a data collection capability, and the like, where the module or apparatus may be independently disposed, or may be integrated into the convergence terminal. This is not limited. The secondary node has a PLC communication function, may be disposed in apparatuses such as a power distribution room, a branch box, an electricity meter box, and an equipment junction box, communicates with other nodes (including the primary node and other secondary nodes) in the low-voltage transformer area through the PLC network, and accepts control and monitoring of the primary node. Further, the secondary node may further have a capability of collecting and reporting data such as electric energy, power, a voltage, and a current, and may receive a control or collection instruction conveyed by the primary node, and collect and report data. For example, the secondary node may include an intelligent switch, an electricity meter, and the like that have a function of the secondary node, and may further include a module or apparatus that has the function of the secondary node, for example, a PLC communication module (or a PLC and RF dual-mode communication module), a PLC communication module (or a PLC and RF dual-mode communication module) integrated with a data collection capability, an electricity metering device integrated with a PLC communication function, and the like, where the module or apparatus may be independently disposed, or may be integrated into the intelligent switch or the electricity meter. This is not limited. When the module or apparatus is independently disposed, the module or apparatus may communicate with the intelligent switch or the electricity meter internally by using any one of an RS-485, a serial port, a serial peripheral interface (SPI), or the like.

The plurality of nodes in each low-voltage transformer area may include one or more primary nodes and a plurality of secondary nodes corresponding to the primary node. As shown in FIG. 1, the low-voltage transformer area A includes one primary node, namely, a1. The other nodes (namely, a2, a3, a4, . . . ) are secondary nodes corresponding to a1. The low-voltage transformer area B includes two primary nodes, namely, b1 and b2. Some of the other nodes (namely, b3, b4, b5, . . . ) are secondary nodes corresponding to b1, and the remaining ones are secondary nodes corresponding to b2. It may be understood that a quantity of primary nodes and a quantity of secondary nodes in a low-voltage transformer area may be configured based on an actual application. This is not limited in this embodiment of this disclosure.

According to the method for identifying a topology of a low-voltage transformer area provided in this embodiment of this disclosure, a topology of any low-voltage transformer area in FIG. 1 can be identified. The topology may include a connection relationship between secondary nodes in the low-voltage transformer area, for example, a connection relationship between nodes in a same branch box and a node connection relationship between different branch boxes. The topology may further include a connection relationship between a primary node and a secondary node, for example, a connection relationship between a primary node and a secondary node in a power distribution room.

For ease of description, the following uses the low-voltage transformer area A shown in FIG. 1 as an example to describe the method for identifying a topology of a low-voltage transformer area provided in the embodiments of this disclosure.

Figure 2:
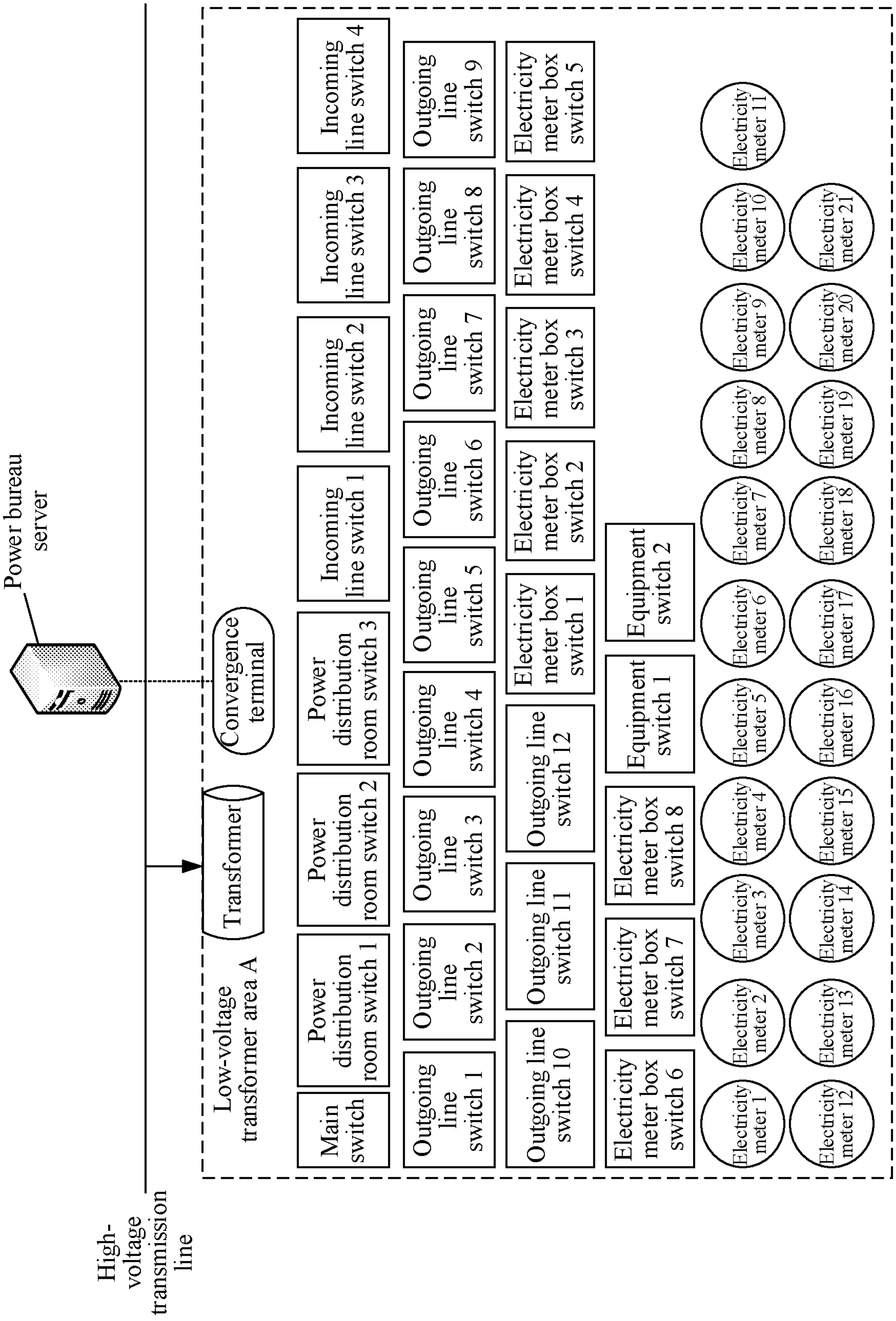
FIG. 2 is a schematic diagram of a node in a low-voltage transformer area A in FIG. 1.

FIG. 2 is a schematic diagram of a node in a low-voltage transformer area A in FIG. 1. As shown in FIG. 2, the low-voltage transformer area A includes a plurality of nodes. A convergence terminal is a primary node in the low-voltage transformer area A, and a main switch, a power distribution room switch 1 to a power distribution room switch 3, an incoming line switch 1 to an incoming line switch 4, an outgoing line switch 1 and an outgoing line switch 12, an equipment switch 1, an equipment switch 2, an electricity meter box switch 1 to an electricity meter box switch 8, and an electricity meter 1 to an electricity meter 21 are a plurality of secondary nodes corresponding to the convergence terminal. The convergence terminal may be disposed in a power distribution room of the low-voltage transformer area A, or may be disposed outside the power distribution room or in a branch box. The main switch and the power distribution room switch 1 to the power distribution room switch 3 may be disposed in the power distribution room. The incoming line switch 1 to the incoming line switch 4 and the outgoing line switch 1 to the outgoing line switch 12 may be disposed in the branch box. The equipment switch 1 and the equipment switch 2 may be disposed in an equipment junction box. The electricity meter box switch 1 to the electricity meter box switch 8 and the electricity meter 1 to the electricity meter 21 may be disposed in the electricity meter box. The method for identifying a topology of a low-voltage transformer area in the embodiments of this disclosure is performed, through configuration, on one or more nodes in the low-voltage transformer area A, so that a topology of the low-voltage transformer area A can be automatically identified. For example, when the convergence terminal is disposed in or outside the power distribution room, the topology of the low-voltage transformer area A may include a connection relationship between power distribution room switches and the main switch in the power distribution room, a connection relationship between incoming line switches and outgoing line switches in a same branch box, a connection relationship between equipment switches in a same equipment junction box, a connection relationship between electricity meter box switches and electricity meters in a same electricity meter box, a connection relationship between the power distribution room and different branch boxes, a connection relationship between the different branch boxes, a connection relationship between branch boxes and electricity meter boxes, a connection relationship between the branch boxes and equipment junction boxes, and the like. In addition, when the convergence terminal is disposed in the power distribution room, a connection relationship between the convergence terminal and the main switch in the power distribution room and a connection relationship between the convergence terminal and the power distribution room switches may be further included.

It may be understood that a quantity of primary nodes and secondary nodes, a type of each node, and the like in the low-voltage transformer area A in FIG. 2 are merely examples. This is not limited in this embodiment of this disclosure.

It should be noted that, the foregoing disclosure scenarios described in the embodiments of this disclosure are intended to describe the technical solutions in the embodiments of this disclosure more clearly, but do not constitute a limitation on the technical solutions provided in the embodiments of this disclosure. A person of ordinary skill in the art may know that with evolution of a PLC network architecture and emergence of a new service scenario, and in another wired communication network architecture, the technical solutions provided in the embodiments of this disclosure are also applicable to a similar technical problem.

The following describes in detail the method for identifying a topology of a power line low-voltage transformer area provided in the embodiments of this disclosure.

Figure 3:
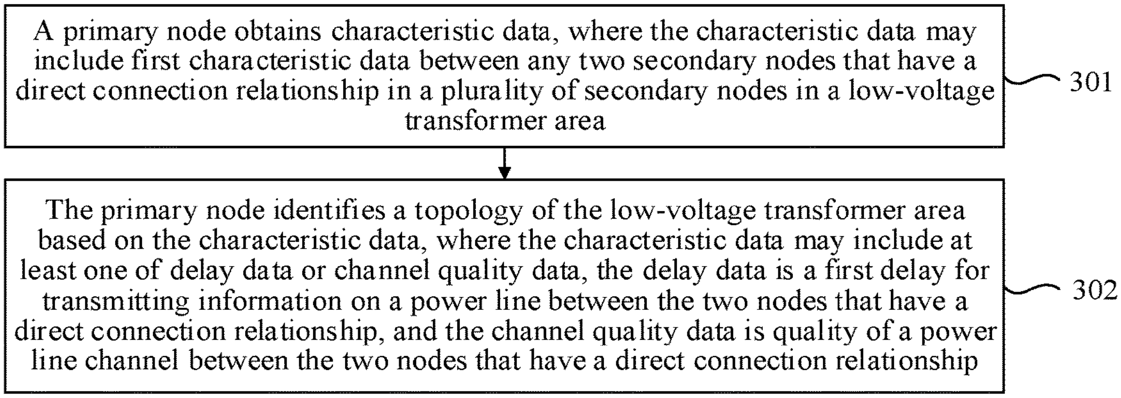
FIG. 3 is a flowchart of a method for identifying a topology of a power line low-voltage transformer area according to an embodiment of this disclosure.

FIG. 3 is a flowchart of a method for identifying a topology of a power line low-voltage transformer area according to an embodiment of this disclosure. As shown in FIG. 3, the method may include the following steps.

Step 301: A primary node obtains characteristic data, where the characteristic data may include: first characteristic data between any two secondary nodes that have a direct connection relationship in a plurality of secondary nodes in the low-voltage transformer area.

Step 302: The primary node identifies the topology of the low-voltage transformer area based on the characteristic data, where the characteristic data may include at least one of delay data or channel quality data, the delay data is a first delay for transmitting information on a power line between the two nodes that have a direct connection relationship, and the channel quality data is quality of a power line channel between the two nodes that have a direct connection relationship.

The low-voltage transformer area may include a plurality of nodes, the plurality of nodes may include a primary node and a plurality of secondary nodes corresponding to the primary node, and a quantity of primary nodes in the low-voltage transformer area may be one or more. For example, the low-voltage transformer area may be the low-voltage transformer area A shown in FIG. 2, the primary node may be the convergence terminal in FIG. 2, and the plurality of secondary nodes may be the main switch, the power distribution room switch 1 to the power distribution room switch 3, the incoming line switch 1 to the incoming line switch 4, the outgoing line switch 1 to the outgoing line switch 12, the equipment switch 1, the equipment switch 2, the electricity meter box switch 1 to the electricity meter box switch 8, and the electricity meter 1 to the electricity meter 21 in FIG. 2.

When PLC communication is performed between two nodes in the low-voltage transformer area, if the two nodes can directly perform PLC communication through a power line, and another node does not need to serve as an intermediate agent for the PLC communication, the two nodes have a direct connection relationship. On the contrary, if the two nodes cannot directly perform PLC communication through the power line, and the PLC communication between the two nodes can be implemented only by using another node as an intermediate agent for the PLC communication, the two nodes do not have a direct connection relationship. For example, there may be a direct connection relationship between an incoming line switch and an outgoing line switch in a branch box, and there may be a direct connection relationship between an electricity meter box switch in an electricity meter box and an upper-level outgoing line switch corresponding to the electricity meter box switch. There may be no direct connection relationship between an electricity meter box switch in an electricity meter box and an equipment switch in an equipment junction box. Any node in the low-voltage transformer area may determine, according to an existing PLC communication protocol, another node that has a direct connection relationship with the node.

For example, the channel quality data may include: at least one of a signal attenuation value, signal strength, or a signal-to-noise ratio. Correspondingly, the quality of the power line channel between the two nodes that have a direct connection relationship may include: an attenuation value of strength of a signal received by one node relative to strength of the signal sent by the other node when the two nodes transmit the signal through the power line; may further include, when one node sends a signal with specific strength, strength of the signal received by the other node when the two nodes transmit the signal through the power line; and may further include: when one node sends a signal with a specific signal-to-noise ratio, a signal-to-noise ratio of the signal received by the other node when the two nodes transmit the signal through the power line. It may be understood that, in addition to the delay data and the channel quality data, other data, for example, a distance that is between the two nodes having a direct connection relationship and that is determined based on a product of a first delay and a speed of light, equivalent to the delay data and the channel quality data may also be used as the characteristic data.

In the low-voltage transformer area, a length of a power line between two nodes that have a direct connection relationship in a same electricity meter box, branch box, equipment junction box, or distribution room is usually far less than a length of a power line between two nodes that have a direct connection relationship in different electricity meter boxes, branch boxes, equipment junction boxes, and distribution rooms. Lengths of power lines between two nodes that have a direct connection relationship in the different electricity meter boxes, branch boxes, equipment junction boxes, and power distribution rooms are also different. For example, a length of a power line between two nodes that have a direct connection relationship in a first electricity meter box is usually different from a length of a power line between two nodes that have a direct connection relationship in a second electricity meter box. However, a difference between lengths of power lines between any two nodes that have a direct connection relationship in the first electricity meter box is usually relatively small. A shorter length of a power line between two nodes that have a direct connection relationship indicates a smaller first delay for transmitting information on the power line between the two nodes, and quality of a power line channel between the two nodes is better. Therefore, at least one of the first delay (namely, the delay data) for transmitting information on the power line between the two nodes that have a direct connection relationship or quality (namely, the channel quality data) of the power line channel between the two nodes may be used to represent a length of the power line between the two nodes. In this way, a connection relationship between the nodes in the low-voltage transformer area may be determined based on at least one of delay data or channel quality data of all two nodes that have a direct connection relationship in the low-voltage transformer area and based on the differences between the lengths of the power lines.

For example, the primary node may obtain first characteristic data between all two secondary nodes that have a direct connection relationship in the plurality of secondary nodes in the low-voltage transformer area, and then determine, based on the first characteristic data between all the two secondary nodes that have a direct connection relationship and with reference to the foregoing differences between the lengths of the power lines, the connection relationship between the secondary nodes in the low-voltage transformer area to identify the topology of the low-voltage transformer area. The first characteristic data between the two secondary nodes that have a direct connection relationship may include: a first delay for transmitting information on a power line between the two secondary nodes, may include: quality of a power line channel between the two secondary nodes, or includes both the first delay for transmitting information on the power line between the two secondary nodes and the quality of the power line channel. The first characteristic data does not depend on load of a power grid, that is, the first characteristic data may still be obtained when there is no load on the secondary node. In this way, reliability of the identification method and accuracy of an identification result are improved. Compared with a manner of generating a disturbance current to identify the topology of the low-voltage transformer area, in this method, each node does not need to have a disturbance current sending and monitoring capability, and therefore a communication module of each node in a current power grid does not need to be replaced. This avoids a large workload of replacement, reduces costs, and improves universality of the identification method. Moreover, the disturbance current does not need to be sent. This avoids interference to a power environment. Compared with a manner in which a PLC communication module and an RF communication module are added on each node of the low-voltage transformer area to identify the topology of the low-voltage transformer area, in this method, a large quantity of communication modules of each node do not need to be replaced, and only a PLC communication module (or an HPLC communication module) commonly configured on each node is used, so that a relatively large workload of replacement is avoided. Costs are reduced, and universality is high. In addition, the delay data or the channel quality data is data determined based on the power line between the two nodes, and does not depend on the load of the power grid, that is, the delay data or the channel quality data is independent of the load of the power grid. In this way, in a case of whether there is load connected to a circuit loop of the two nodes, the delay data or the channel quality data can be obtained by performing PLC communication through the power line between the two nodes. Therefore, the topology of the low-voltage transformer area can still be accurately identified when there is no load or there is only light load on each node.

In this embodiment of this disclosure, the primary node obtains characteristic data. The characteristic data includes: the first characteristic data between the any two secondary nodes that have a direct connection relationship in the plurality of secondary nodes in the low-voltage transformer area. The primary node identifies the topology of the low-voltage transformer area based on the characteristic data, where the characteristic data includes at least one of the delay data or the channel quality data. In this way, each node in the low-voltage transformer area does not need to have a disturbance current sending and monitoring capability or a PLC and RF dual-mode communication function. This greatly reduces a capability requirement on each node. Costs are low, and universality is high. In addition, the delay data or the channel quality data does not depend on the load of the power grid. This improves identification reliability and accuracy. Moreover, there is no need to send a disturbance current. This avoids interference to a power environment.

For example, the channel quality data may further include: quality of a radio channel between the two nodes that have a direct connection relationship in the low-voltage transformer area. The quality of the radio channel between the two nodes that have a direct connection relationship may include: an attenuation value of strength of a signal received by one node relative to strength of the signal sent by the other node when the two nodes transmit the signal in a wireless manner; when one node sends a signal with specific strength, strength of the signal received by the other node; or when one node sends a signal with a specific signal-to-noise ratio, a signal-to-noise ratio of the signal received by the other node. The quality of the radio channel may represent a spatial linear distance between the two nodes, and the quality of the power line channel may represent a length of the power line between the two nodes. Therefore, the quality of the power line channel may be corrected based on the quality of the radio channel. For example, because the power line between the two nodes is bent, the spatial distance between the two nodes that is represented by the quality of the radio channel between the two nodes is usually less than the length of the power line between the two nodes that is represented by the quality of the power line channel between the two nodes. If the spatial distance between the two nodes that is represented by the quality of the radio channel between the two nodes is greater than the length of the power line between the two nodes that is represented by the quality of the power line channel between the two nodes, the quality of the power line channel may be inaccurate, and the quality of the power line channel may be further accurately obtained in a manner such as re-measurement. For another example, if the spatial linear line distance between the two nodes is quite close (where for example, the two nodes are located in a same electricity meter box), the length of the power line between the two nodes is usually relatively short. Consequently, if the spatial distance between the two nodes that is represented by the quality of the radio channel between the two nodes is smaller, and the length of the power line between the two nodes that is represented by the quality of the power line channel between the two nodes is larger, the quality of the power line channel may be inaccurate. The accurate quality of the power line channel may be further obtained in a manner such as re-measurement. In this way, a wireless communication function between nodes can be fully utilized to obtain the quality of the radio channel between the any two secondary nodes that have a direct connection relationship. In this way, the quality of the power line channel can be corrected, so that accuracy of the quality of the power line channel is higher. Further, a connection relationship between the secondary nodes in the low-voltage transformer area can be more accurately determined, so that accuracy of topology identification of the low-voltage transformer area is further improved.

In a possible implementation, at least one physical phase is included between the two nodes that have a direct connection relationship in the low-voltage transformer area, and the characteristic data between the two nodes may include: two pieces of characteristic data that have a same physical phase between the two nodes.

In the low-voltage transformer area, three phases (namely, a phase A, a phase B, and a phase C) are usually included for power lines, and the two nodes that have a direct connection relationship may perform PLC communication by using a power line of any phase in power lines of the three phases as a channel or by using power lines of a plurality of phases as channels. The phase of the power line used for PLC communication between the two nodes is the physical phase between the two nodes. Correspondingly, the characteristic data between the two nodes may be obtained through PLC communication. The phase of the power line used for PLC communication is the physical phase of the characteristic data between the two nodes, and characteristic data obtained by performing PLC communication by using power lines of a same phase is characteristic data with a same physical phase. The characteristic data between the two nodes obtained by the primary node may include the characteristic data that has the same physical phase between the two nodes. For example, when PLC communication is performed between the two nodes that have a direct connection relationship through a power line of the phase A, the characteristic data between the two nodes may include: characteristic data of the phase A between the two nodes. When PLC communication is performed between the two nodes that have a direct connection relationship through power lines of the phase A and the phase B, the characteristic data between the two nodes may include: characteristic data of the phase A between the two nodes, or characteristic data of the phase B between the two nodes. For example, the characteristic data is delay data. If the incoming line switch 1, the outgoing line switch 1, and the outgoing line switch 2 in FIG. 2 are located on a same branch line, the incoming line switch 1 performs PLC communication with the outgoing line switch 1 through the power line of the phase A, and performs PLC communication with the outgoing line switch 2 through the power lines of the phase B and the phase C. In this case, delay data between the incoming line switch 1 and the outgoing line switch 1 may include delay data of the phase A, and delay data between the incoming line switch 1 and the outgoing line switch 2 may include delay data of the phase B or delay data of the phase C. Because the characteristic data with the same physical phase is generated through the power line of the same phase, a length of the power line between the two nodes can be more accurately represented, and accuracy of topology identification of the low-voltage transformer area can be further improved. In addition, the characteristic data with the same physical phase between the two nodes that have a direct connection relationship is measured. This effectively reduces a measurement resource and measurement time of the characteristic data, and further improves efficiency of topology identification of the low-voltage transformer area performed by the primary node.

In a possible implementation, the characteristic data may further include: second characteristic data between the primary node and a secondary node that is in the low-voltage transformer area and that is in a direct connection relationship with the primary node. For example, the primary node may be disposed in the power distribution room in the low-voltage transformer area, and the second characteristic data may include: at least one of delay data or channel quality data between the primary node and any secondary node that has a direct connection relationship with the primary node. In this way, the primary node may obtain first characteristic data between all two secondary nodes that have a direct connection relationship in the plurality of secondary nodes in the low-voltage transformer area and second characteristic data between the primary node and all secondary nodes that have a direct connection relationship, and further determine a connection relationship between the nodes (including between the secondary nodes and between the primary node and the secondary nodes) in the low-voltage transformer area based on the first characteristic data and the second characteristic data, to identify the topology of the low-voltage transformer area.

For example, the two nodes that have a direct connection relationship may both measure the characteristic data between the two nodes, or one node may measure the characteristic data between the two nodes. Further, the two nodes or one node may alternatively perform measurement a plurality of times, and perform statistical analysis on results of the plurality of times of measurement, for example, perform processing such as obtaining an average or a maximum value, to obtain the characteristic data between the two nodes. In addition, accuracy of the obtained characteristic data is higher. When the two nodes both perform measurement, processing such as obtaining an average may be performed on measurement results of the two nodes, to obtain the characteristic data between the two nodes. When measurement is performed by one node, the node for performing measurement may be determined according to a preset rule. For example, the node for performing measurement may be randomly selected. Alternatively, a node with a smaller number in the two nodes may be configured, based on unique numbers of the two nodes in the low-voltage transformer area, to perform measurement, so that repeated measurement is avoided. This effectively reduces a measurement resource and improves measurement efficiency.

It may be understood that at least one of the two nodes that have a direct connection relationship measures the characteristic data between the two nodes. For example, at least one of the two secondary nodes that have a direct connection relationship measures the first characteristic data; and at least one of the secondary node that has a direct connection relationship with the primary node and the primary node measures the second characteristic data. According to different nodes that measure the characteristic data, the primary node may obtain the characteristic data in the following manners.

Figure 4:
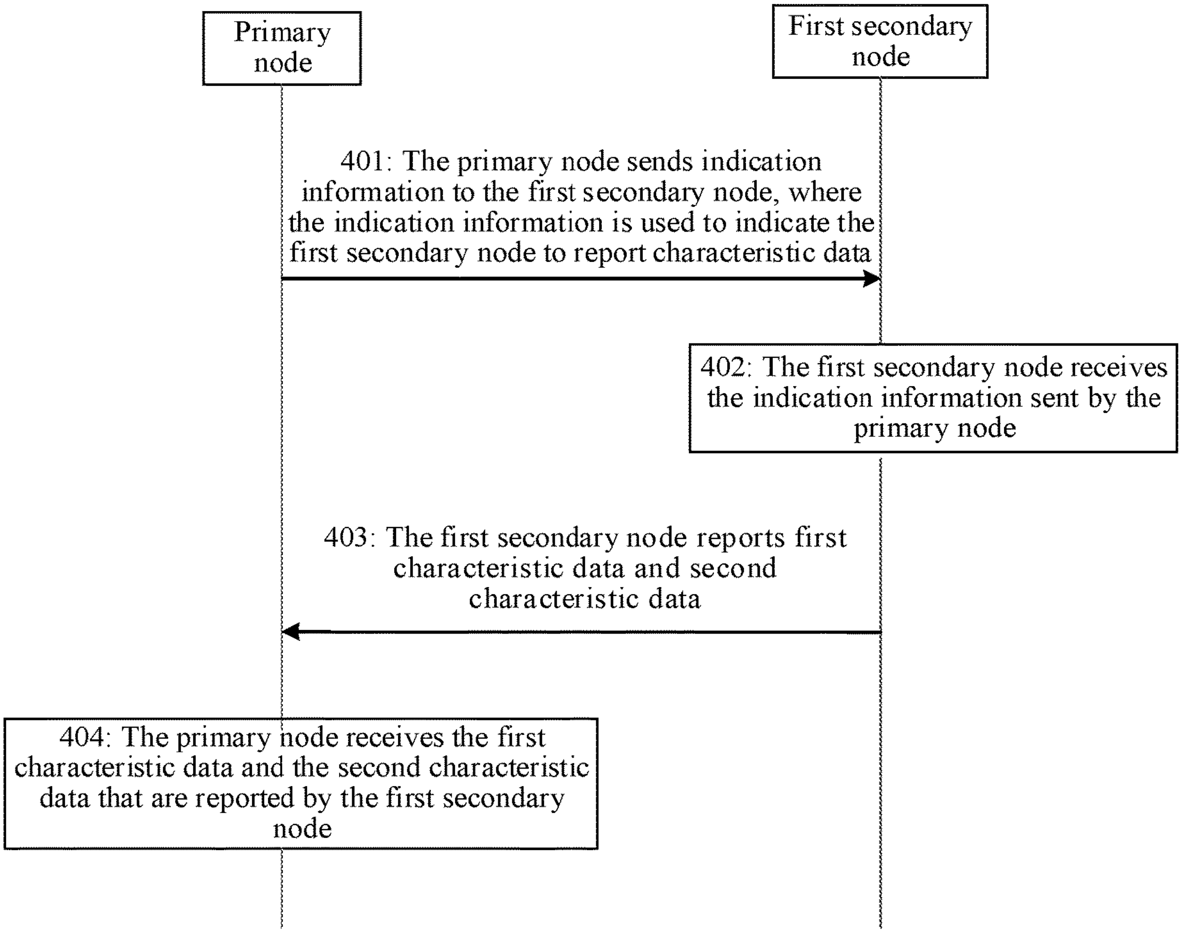
FIG. 4 is a flowchart of obtaining characteristic data by a primary node according to an embodiment of this disclosure.

Manner 1:

FIG. 4 is a flowchart of obtaining characteristic data by a primary node according to an embodiment of this disclosure. As shown in FIG. 4, the following steps may be included.

Step 401: The primary node sends indication information to a first secondary node.

The indication information indicates the first secondary node to report the characteristic data. In a low-voltage transformer area, a plurality of secondary nodes corresponding to the primary node may include the first secondary node, and the first secondary node may be any secondary node in the plurality of secondary nodes. For example, the primary node may send the indication information to all secondary nodes in the low-voltage transformer area through broadcasting, or may send the indication information to all secondary nodes that measure the characteristic data. For example, the indication information may be further used to indicate the first secondary node to measure the characteristic data.

Step 402: The first secondary node receives the indication information sent by the primary node.

In this step, the first secondary node may receive the indication information sent by the primary node, and prepare to report the measured characteristic data.

For example, before receiving the indication information sent by the primary node, the first secondary node may measure the characteristic data according to a preset rule, for example, may periodically measure the characteristic data. Alternatively, after receiving the indication information sent by the primary node, the first secondary node may measure the characteristic data in response to the indication information.

For example, the first secondary node may measure first characteristic data, for example, a first delay for transmitting information through a power line between the first secondary node and a second secondary node that has a direct connection relationship with the first secondary node and that is in the low-voltage transformer area, and quality of a power line channel between the first secondary node and the second secondary node. If the first secondary node is a secondary node that has a direct connection relationship with the primary node, the first secondary node may further measure second characteristic data, for example, a first delay for transmitting information through a power line between the first secondary node and the primary node, and quality of a power line channel between the first secondary node and the primary node. For example, the first secondary node may measure first characteristic data that has a same physical phase.

Step 403: The first secondary node reports the first characteristic data and the second characteristic data.

In this step, the first secondary node may report the characteristic data in response to the indication information. The characteristic data may include: the first characteristic data and the second characteristic data that are measured by the first secondary node, where it may be understood that if the first secondary node does not have a direct connection relationship with the primary node, the second characteristic data measured by the first secondary node is null.

Step 404: The primary node receives the first characteristic data and the second characteristic data that are reported by the first secondary node.

In this step, the primary node may receive the first characteristic data and the second characteristic data that are reported by the first secondary node.

In this way, in step 401 to step 404, the primary node may obtain the first characteristic data and the second characteristic data that are measured by the secondary node in the low-voltage transformer area, and the primary node does not need to measure the second characteristic data. This reduces a processing resource of the primary node. This manner may be applicable to a scenario in which the primary node is disposed in a power distribution room and the processing resource is relatively limited.

Figure 5:
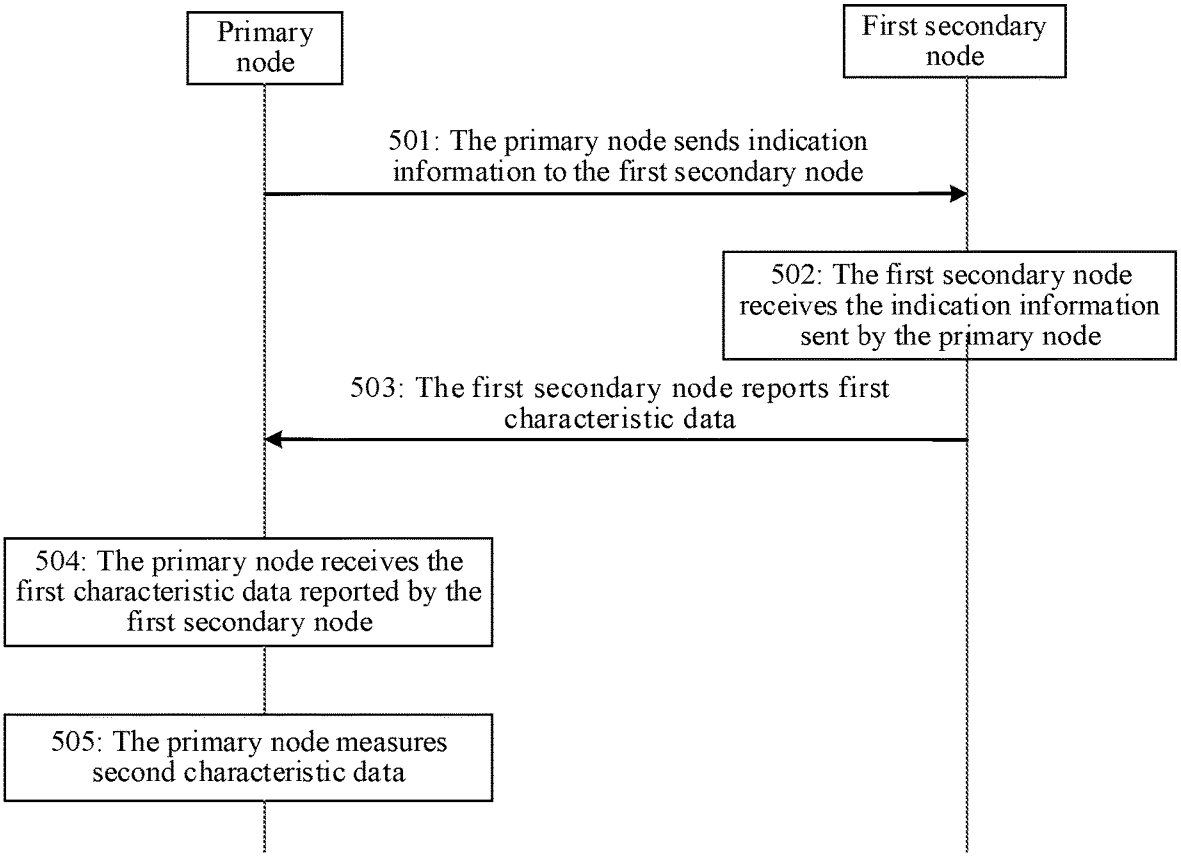
FIG. 5 is another flowchart of obtaining characteristic data by a primary node according to an embodiment of this disclosure.

Manner 2:

FIG. 5 is another flowchart of obtaining characteristic data by a primary node according to an embodiment of this disclosure. As shown in FIG. 5, the method may include the following steps.

Step 501: The primary node sends indication information to a first secondary node.

For a specific description of this step, refer to the related description of step 401.

Step 502: The first secondary node receives the indication information sent by the primary node.

For a specific description of this step, refer to the related description of step 402.

Step 503: The first secondary node reports first characteristic data.

In this step, the first secondary node may report the first characteristic data in response to the indication information.

For example, if the first secondary node has a direct connection relationship with the primary node, the first secondary node may report the first characteristic data and second characteristic data.

Step 504: The primary node receives the first characteristic data reported by the first secondary node.

In this step, the primary node may receive the first characteristic data reported by the first secondary node.

For example, if the first secondary node reports the first characteristic data and the second characteristic data, the primary node may further receive the second characteristic data.

Step 505: The primary node measures the second characteristic data.

In this step, the primary node may measure the second characteristic data. For example, the primary node may measure second characteristic data that has a same physical phase. In this way, in step 501 to step 505, the primary node may obtain the first characteristic data measured by the secondary node in a low-voltage transformer area, and measure the second characteristic data, to fully use a processing resource of the primary node. In this way, the first characteristic data and the second characteristic data are obtained. This manner is applicable to a scenario in which the primary node is disposed in a power distribution room and has a relatively rich processing resource.

For example, if the primary node receives second characteristic data, the primary node may perform statistical analysis on the received second characteristic data and the second characteristic data measured by the primary node, and determine final second characteristic data.

It should be noted that step 505 may be performed before or after any one of step 501, step 502, step 503, and step 504. This is not limited.

In a possible implementation, step 505 may be an optional step. The primary node may obtain, in step 501 to step 504, the first characteristic data measured by the secondary node in the low-voltage transformer area. This manner is applicable to a scenario in which the primary node is disposed outside the power distribution room.

The following uses delay data as an example to describe an example of a process in which a node measures the characteristic data.

For example, a first delay between two nodes that have a direct connection relationship in the low-voltage transformer area is determined based on moments at which the two nodes send information, moments at which the two nodes receive information, and internal delays. The two nodes include a first node, the first node is coupled to a first end of the power line, and sends first information and receives second information through the power line, and an internal delay of the first node includes a second delay between a moment at which the first node sends the first information and a moment at which the first information arrives at the first end of the power line, and a third delay between a moment at which the second information arrives at the first end of the power line and a moment at which the first node receives the second information. The first node may be any node in the low-voltage transformer area, for example, may be the primary node, or may be the foregoing first secondary node. The internal delay of the first node may be measured and determined in advance. In this way, the moments at which the two nodes that have a direct connection relationship send information, the moments at which the two nodes receive information, and the internal delays are used to determine the first delay between the two nodes, so that impact of a delay difference between information sending and receiving by different nodes on measuring the first delay is fully considered, thereby improving accuracy of the measured first delay.

Figure 6:
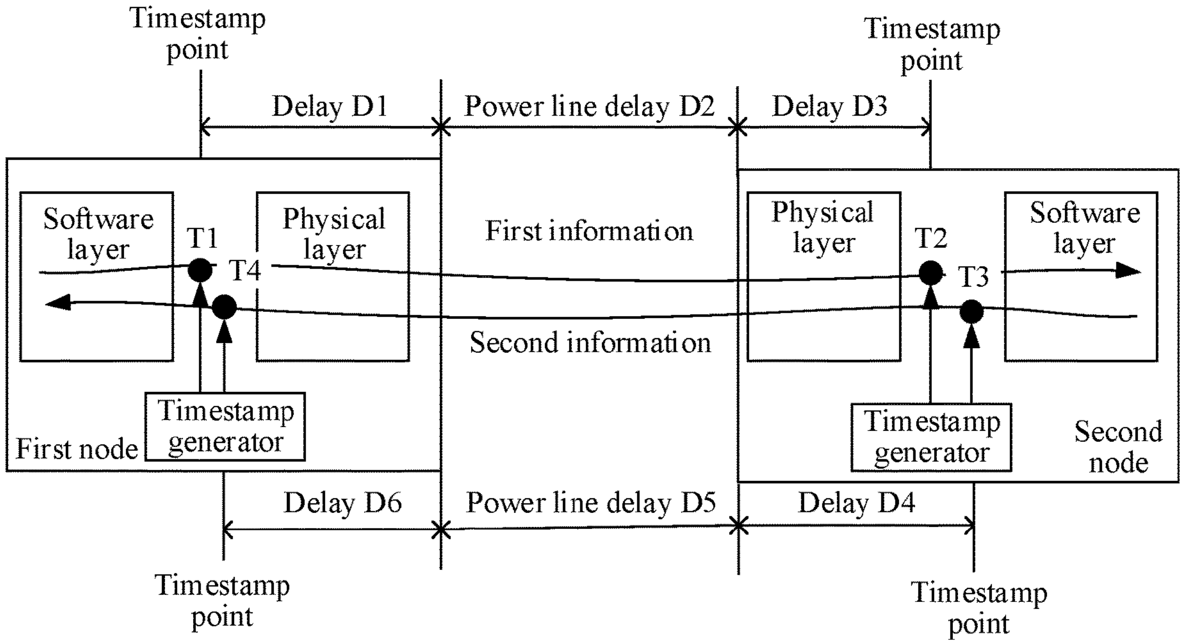
FIG. 6 is a schematic diagram of measuring a first delay between two nodes that have a direct connection relationship according to an embodiment of this disclosure.

FIG. 6 is a schematic diagram of measuring a first delay between two nodes that have a direct connection relationship according to an embodiment of this disclosure. As shown in FIG. 6, the two nodes that have the direct connection relationship may include a first node and a second node, the first node is coupled to a first end of a power line, and the second node is coupled to a second end of the power line. The first node sends first information to the second node. The first node uses a timestamp generator to stamp a time point, which is denoted as T1, at a moment at which the first information is sent at a software layer, and the second node uses a timestamp generator to stamp a time point, which is denoted as T2, at a moment at which the first information is received at a software layer. The second node sends second information to the first node. The second node uses the timestamp generator to stamp a time point, which is denoted as T3, at a moment at which the second information is sent at the software layer, and the first node uses the timestamp generator to stamp a time point, which is denoted as T4, at a moment at which the second information is received at the software layer. In this case, a first delay T between the first node and the second node may be shown in Formula (1) below:

$$T=D2+D5=(T2-T1)+(T4-T3)-(D1+D6)-(D3+D4) \quad (1)$$

D1 is a delay between the moment at which the first node sends the first information at the software layer and a moment at which the first information arrives at the first end of the power line after passing through a physical layer of the first node. D2 is a delay of the first information from the first end to the second end of the power line. D3 is a delay between a moment at which the first information arrives at the second end of the power line and the moment at which the first information is received by the second node at the software layer after passing through a physical layer of the second node. D4 is a delay between the moment at which the second node sends the second information at the software layer and a moment at which the second information arrives at the second end of the power line after passing through the physical layer of the second node. D5 is a delay of the second information from the second end to the first end of the power line. D6 is a delay between a moment at which the second information arrives at the first end of the power line and a moment at which the second information is received by the first node at the software layer after passing through the physical layer of the first node. D1+D6 is a sum of delays for sending and receiving information inside the first node, namely, an internal delay of the first node. D3+D4 is a sum of delays for sending and receiving information inside the second node, namely, an internal delay of the second node.

For example, the node in the low-voltage transformer area may measure the delay data in the following manners.

Figure 7:
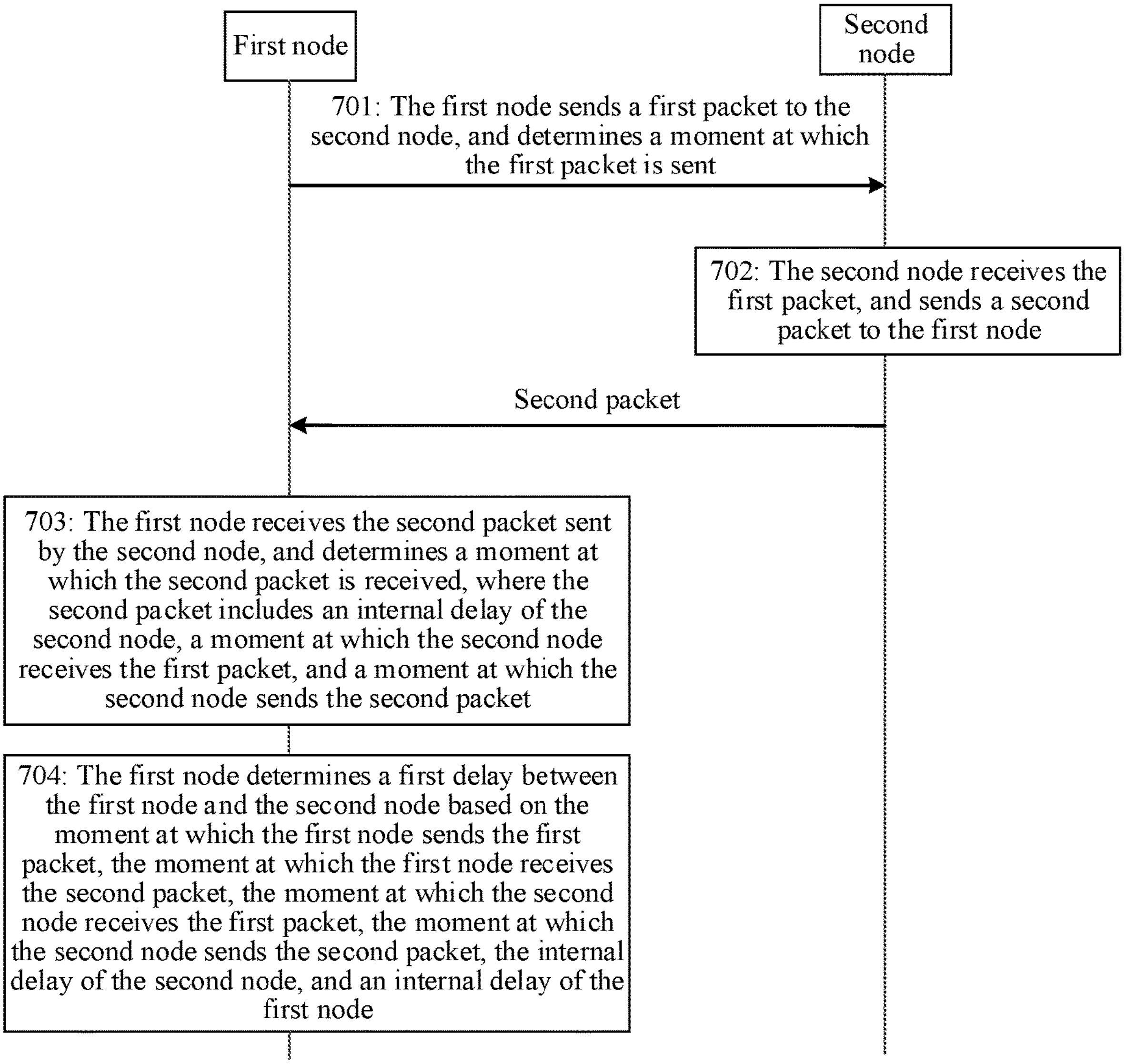
FIG. 7 is a flowchart of measuring delay data by a node according to an embodiment of this disclosure.

Manner 1:

FIG. 7 is a flowchart of measuring delay data by a node according to an embodiment of this disclosure. As shown in FIG. 7, the following steps may be included.

Step 701: A first node sends a first packet to a second node, and determines a moment at which the first packet is sent.

In this step, the first node and the second node have a direct connection relationship. For example, the first packet may be a dedicated packet used to measure the delay data. For example, the first packet may carry data such as a moment at which the first node sends the first packet.

Step 702: The second node receives the first packet, and sends a second packet to the first node.

In this step, the second node receives the first packet, and determines a moment at which the first packet is received. The second node sends the second packet to the first node in response to the first packet, and determines a moment at which the second packet is sent. For example, the second packet may be a dedicated packet used to measure the delay data.

Step 703: The first node receives the second packet sent by the second node, and determines a moment at which the second packet is received. The second packet may include an internal delay of the second node, the moment at which the second node receives the first packet, and the moment at which the second node sends the second packet.

For example, the second packet may alternatively include an internal delay of the second node, a difference between the moment at which the second node receives the first packet and the moment at which the first node sends the first packet, and the moment at which the second node sends the second packet.

Step 704: The first node determines a first delay between the first node and the second node based on the moment at which the first node sends the first packet, the moment at which the first node receives the second packet, the moment at which the second node receives the first packet, the moment at which the second node sends the second packet, the internal delay of the second node, and an internal delay of the first node.

In this step, the first node may determine the first delay between the first node and the second node based on data included in the second packet, and the moment at which the first packet is sent, the moment at which the second packet is received, and the internal delay of the first node that are determined by the first node, and with reference to Formula (1).

In step 701 to step 704, the first packet and the second packet may be dedicated packets used to measure the delay data, and sufficient resources of the dedicated packets may carry data such as the moments for receiving and sending the packets and the internal delays that are determined by the first node and the second node. In this way, the first node can obtain data required for measuring the first delay provided that one round of PLC communication is performed between the first node and the second node by using the first packet and the second packet, so that the first delay between the first node and the second node can be determined, thereby improving measurement efficiency.

Figure 8:
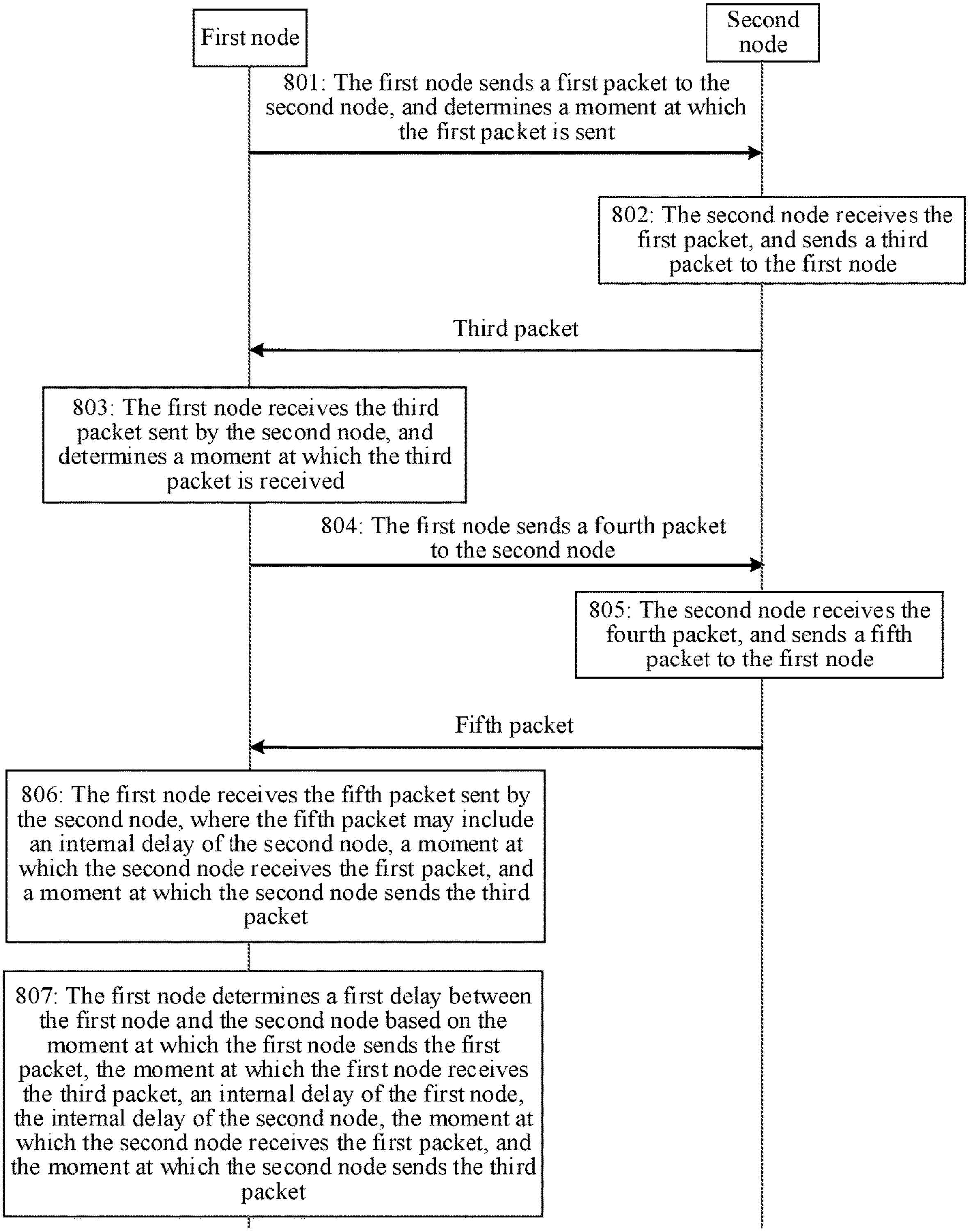
FIG. 8 is another flowchart of measuring delay data by a node according to an embodiment of this disclosure.

Manner 2:

FIG. 8 is another flowchart of measuring delay data by a node according to an embodiment of this disclosure. As shown in FIG. 8, the method may include the following steps.

Step 801: A first node sends a first packet to a second node, and determines a moment at which the first packet is sent.

In this step, the first node and the second node have a direct connection relationship. For example, an existing packet in a PLC communication protocol may be reused or a short frame packet may be used as the first packet.

Step 802: The second node receives the first packet, and sends a third packet to the first node.

In this step, the second node receives the first packet, and determines a moment at which the first packet is received. The second node sends the third packet to the first node in response to the first packet, and determines a moment at which the third packet is sent. For example, an existing packet in the PLC communication protocol may be reused or a short frame packet may be used for the third packet.

Step 803: The first node receives the third packet sent by the second node, and determines a moment at which the third packet is received.

For example, the third packet may not include an internal delay of the second node, the moment at which the second node receives the first packet, and the moment at which the second node sends the third packet. The second node may locally store the determined moment at which the first packet is received and the determined moment at which the third packet is sent.

Step 804: The first node sends a fourth packet to the second node.

For example, the fourth packet may be used to indicate the second node to feed back the locally stored data, for example, the moment at which the second node receives the first packet, the moment at which the second node sends the third packet, or the internal delay of the second node. For example, an existing packet in the PLC communication protocol may be reused or a short frame packet may be used for the fourth packet.

Step 805: The second node receives the fourth packet, and sends a fifth packet to the first node.

In this step, the second node reports the locally stored data to the first node in response to the fourth packet. For example, an existing packet in the PLC communication protocol may be reused for the fifth packet.

Step 806: The first node receives the fifth packet sent by the second node, where the fifth packet may include: the internal delay of the second node, the moment at which the second node receives the first packet, and the moment at which the second node sends the third packet.

Step 807: The first node determines a first delay between the first node and the second node based on the moment at which the first node sends the first packet, the moment at which the first node receives the third packet, an internal delay of the first node, the internal delay of the second node, the moment at which the second node receives the first packet, and the moment at which the second node sends the third packet.

In this step, the first node may determine the first delay between the first node and the second node based on data included in the fifth packet, and the moment at which the first packet is sent, the moment at which the third packet is received, and the internal delay of the first node that are determined by the first node, and with reference to Formula (1).

In step 801 to step 807, in a process in which PLC communication is performed between the first node and the second node by using the first packet and the third packet, the second node locally stores the moment at which the first packet is received, the moment at which the third packet is sent, and the internal delay of the second node that are determined, and further the data is reported to the first node by using the fifth packet, so that the first node obtains the data required for measuring the first delay, and determines the first delay between the first node and the second node. Existing packets may be reused as the first packet, the third packet, the fourth packet, and the fifth packet, so that remaining resources of the existing packets are fully utilized, and new packets do not need to be separately provided, thereby improving universality of a measurement manner. Alternatively, short frame packets may be used as the first packet and the third packet. This effectively reduces a resource occupied in a measurement process.

Figure 9:
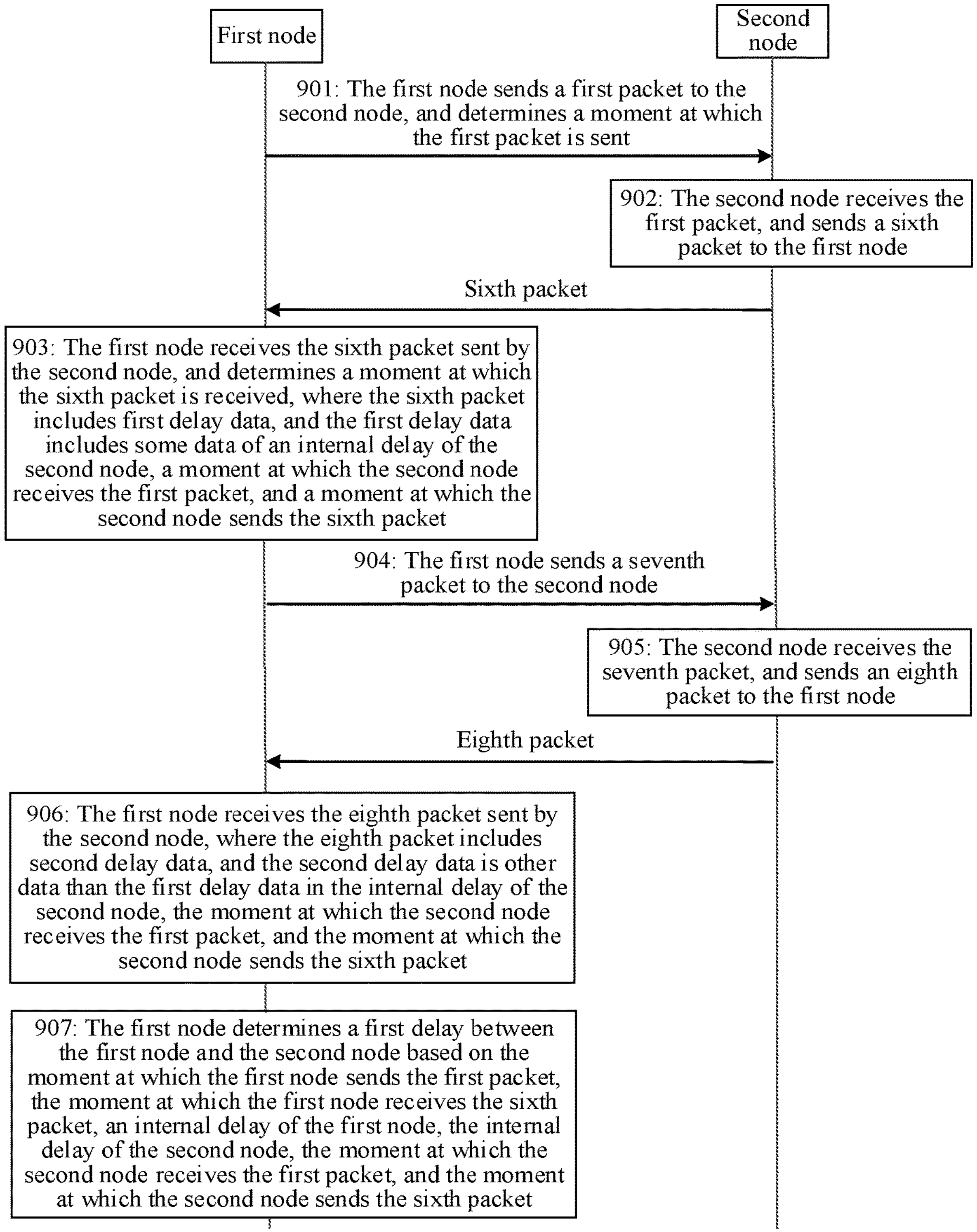
FIG. 9 is another flowchart of measuring delay data by a node according to an embodiment of this disclosure.

Manner 3:

FIG. 9 is another flowchart of measuring delay data by a node according to an embodiment of this disclosure. As shown in FIG. 9, the method may include the following steps.

Step 901: A first node sends a first packet to a second node, and determines a moment at which the first packet is sent.

In this step, the first node and the second node have a direct connection relationship. For example, an existing packet in a PLC communication protocol may be reused or a short frame packet may be used as the first packet.

Step 902: The second node receives the first packet, and sends a sixth packet to the first node.

In this step, the second node receives the first packet, and determines a moment at which the first packet is received. The second node sends the sixth packet to the first node in response to the first packet, and determines a moment at which the sixth packet is sent. For example, an existing packet in the PLC communication protocol may be reused or a short frame packet may be used for the sixth packet.

Step 903: The first node receives the sixth packet sent by the second node, and determines a moment at which the sixth packet is received, where the sixth packet may include first delay data, and the first delay data may include some data of the internal delay of the second node, the moment at which the second node receives the first packet, and the moment at which the second node sends the sixth packet.

In this step, the sixth packet may carry some data of the internal delay of the second node, the moment at which the second node receives the first packet, and the moment at which the second node sends the sixth packet. In addition, the second node retains remaining data locally.

Step 904: The first node sends a seventh packet to the second node.

For example, the seventh packet may be used to indicate the second node to feed back the locally stored remaining data. For example, an existing packet in the PLC communication protocol may be reused or a short frame packet may be used for the seventh packet.

Step 905: The second node receives the seventh packet, and sends an eighth packet to the first node.

In this step, the second node reports the locally stored data to the first node in response to the fourth packet. For example, an existing packet in the PLC communication protocol may be reused or a short frame packet may be used for the fifth packet.

Step 906: The first node receives the eighth packet sent by the second node, where the eighth packet may include second delay data, and the second delay data is other data other than the first delay data in the internal delay of the second node, the moment at which the second node receives the first packet, and the moment at which the second node sends the sixth packet.

Step 907: The first node determines a first delay between the first node and the second node based on the moment at which the first node sends the first packet, the moment at which the first node receives the sixth packet, an internal delay of the first node, the internal delay of the second node, the moment at which the second node receives the first packet, and the moment at which the second node sends the sixth packet.

In this step, the first node may determine the first delay between the first node and the second node based on data included in the eighth packet, and the moment at which the first packet is sent, the moment at which the sixth packet is received, and the internal delay of the first node that are determined by the first node, and with reference to Formula (1).

In step 901 to step 907, the second node reports, to the first node by using the sixth packet and the eighth packet, the moment at which the first packet is received, the moment at which the third packet is sent, and the internal delay of the second node that are determined. In this way, the first node obtains the data required for measuring the first delay, and determines the first delay between the first node and the second node. An existing packet may be reused as each of the first packet, the sixth packet, the seventh packet, and the eighth packet, so that a remaining resource of the existing packet is fully utilized, and a new packet does not need to be separately provided, thereby improving universality of a measurement manner. Alternatively, short frame packets may be used for the first packet, the sixth packet, the seventh packet, and the eighth packet. This effectively reduces a resource occupied in a measurement process.

It should be noted that, a manner in which the node measures the delay data is merely an example. In the measurement process, when PLC communication is performed between the first node and the second node, a quantity of interactions, a quantity of packets used in each interaction, and data carried in the packets are not limited, provided that the first node can obtain the data required for measuring the first delay.

For example, step 701 to step 704, step 801 to step 807, or step 901 to step 907 may be repeatedly performed, and a plurality of rounds of PLC communication may be performed between the first node and the second node to complete a plurality of times of measurements. Processing such as data screening, filtering, and statistics collection may be performed on results of the plurality of times of measurement, to obtain the first delay between the first node and the second node, thereby improving accuracy of the measured first delay.

In a possible implementation, when the first node is a primary node, the second node is a target secondary node that has a direct connection relationship with the primary node. The primary node may measure a first delay between the primary node and the target secondary node in any manner shown in FIG. 7 to FIG. 9. For a specific process, refer to the foregoing description. Details are not described herein again.

In a possible implementation, when the first node is a first secondary node, the second node is a target node that has a direct connection relationship with the first secondary node (which may be a primary node or another secondary node). The first secondary node may measure a first delay between the first secondary node and the target node in any manner shown in FIG. 7 to FIG. 9. For a specific process, refer to the foregoing description. Details are not described herein again.

Further, that a primary node obtains characteristic data in step 301 may further include: The primary node obtains electric power data of the nodes in the low-voltage transformer area. For example, the primary node may receive electric power data measured and reported by the secondary nodes, and the primary node may measure electric power data of the primary node.

The electric power data may include: at least one of a voltage, a current, power, a power factor, a phase angle, waveform distortion of the voltage, waveform distortion of the current, power frequency, electric energy, a maximum demand, a load record, or an event record collected by the nodes in the low-voltage transformer area at a same network time base. The voltage, the current, the power, the power factor, the phase angle, the waveform distortion or harmonic content of the current, the waveform distortion or harmonic content of the voltage, and the power frequency may be collectively referred to as variable data. The maximum demand may be a maximum average load of electrical equipment every 15 min in a settlement period (for example, one day, one week, or one month). The load record may include: electricity metering data frozen at an interval of 15 minutes or one hour, or may include electricity metering data frozen at an interval of one day, one month, or one year, where a type of the electricity metering data may be configured as required.

For example, the primary node may periodically instruct the secondary nodes corresponding to the primary node in the low-voltage transformer area to collect the electric power data at a preset network time base. For example, the primary node sends a synchronous collection notification packet to the secondary nodes, and the secondary nodes respond to the packet. When the preset network time base arrives, the secondary nodes may synchronously collect the electric power data, or the primary node may collect the electric power data at the preset network time base, to implement synchronous collection of the electric power data in the low-voltage transformer area. This effectively avoids a time error existing in collecting the electric power data by the nodes, and synchronization, precision, and differentiation of the electric power data collected by the nodes are higher.

The following describes in detail how the primary node identifies the topology of the low-voltage transformer area based on the obtained characteristic data in step 302.

Figure 10:
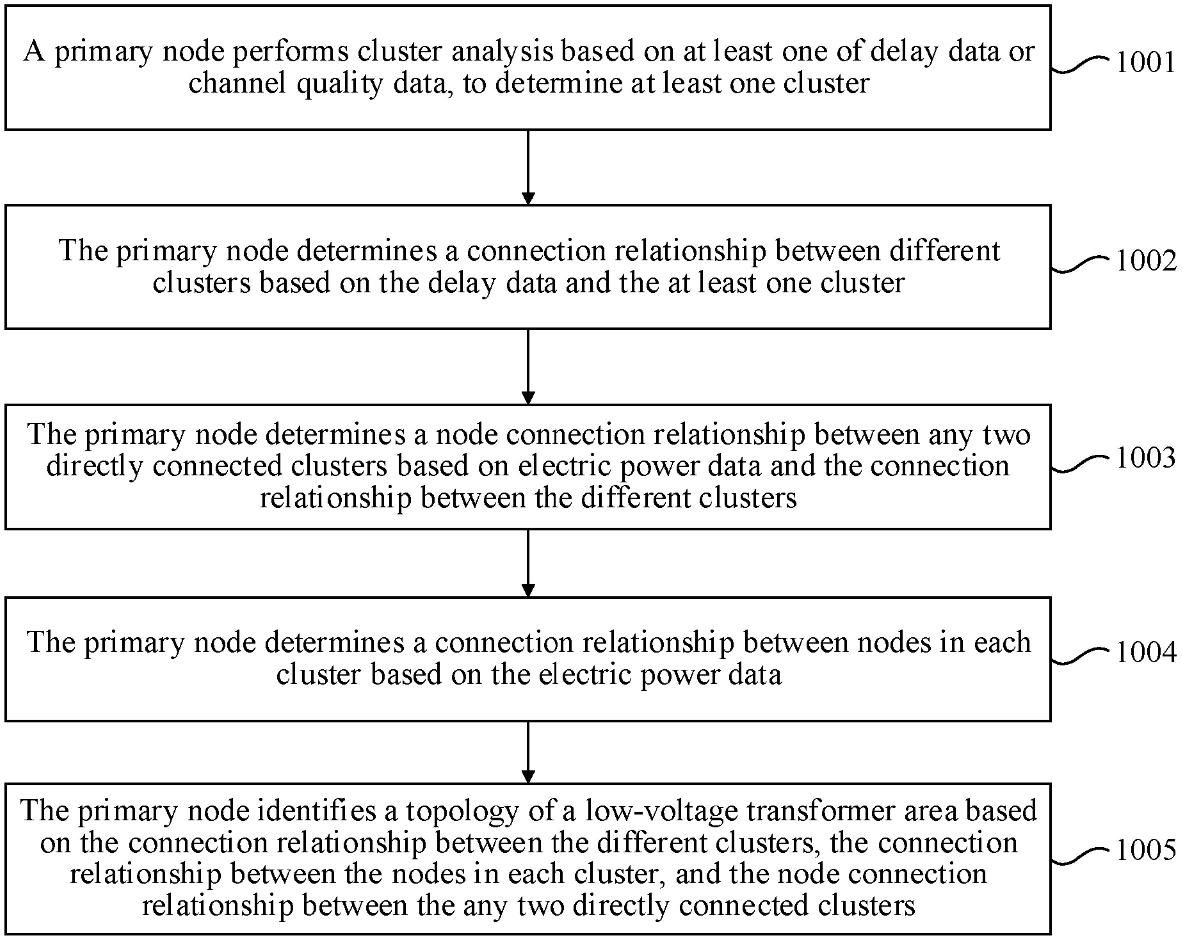
FIG. 10 is a flowchart of identifying a topology of a low-voltage transformer area by a primary node based on characteristic data according to an embodiment of this disclosure.

FIG. 10 is a flowchart of identifying a topology of a low-voltage transformer area by a primary node based on characteristic data according to an embodiment of this disclosure. As shown in FIG. 10, the method may include the following steps.

Step 1001: The primary node performs cluster analysis based on at least one of delay data or channel quality data, to determine at least one cluster, where delay data between nodes in a same cluster meets a first preset condition, and/or channel quality data between the nodes in the same cluster meets a second preset condition.

The cluster may represent a set of nodes whose spatial distances are relatively close. For example, one cluster may include: nodes on a same busbar, nodes in a same branch box, nodes in a same electricity meter box, and nodes in a same equipment junction box in a power distribution room. A cabling distance of a power line between the nodes belonging to the same cluster is relatively short. For example, a cabling distance of a power line between the nodes in the power distribution room is usually within a few electricity meters, and a cabling distance of a power line between the nodes in the same branch box, the same electricity meter box, or the same equipment junction box is usually less than one electricity meter. Therefore, when PLC communication is performed between the nodes in the same cluster, a delay is usually relatively small, and channel quality is relatively high.

For example, the primary node may perform clustering analysis based on the foregoing obtained delay data between all two secondary nodes that have a direct connection relationship in the low-voltage transformer area and by using a clustering criterion that delay data between the nodes in the same cluster meets the first preset condition, to divide all secondary nodes in the low-voltage transformer area into one or more clusters. For example, the first preset condition may be that the delay data between the nodes in the same cluster is less than a preset threshold; for another example, the first preset condition may be that the delay data between the nodes in the same cluster all meet a precision requirement and is all less than a preset threshold; and so on.

For example, the primary node may alternatively perform clustering analysis based on the foregoing obtained channel quality data between all two secondary nodes that have a direct connection relationship in the low-voltage transformer area and by using a clustering criterion that channel quality data between the nodes in the same cluster meets the second preset condition, to divide all secondary nodes in the low-voltage transformer area into one or more clusters. The second preset condition is related to a specific type of the channel quality data. For example, when the channel quality data is a signal attenuation value, the second preset condition may be that the signal attenuation value is less than a preset threshold; or when the channel quality data is a signal-to-noise ratio, the second preset condition may be that the signal-to-noise ratio is greater than a preset threshold.

For example, the primary node may alternatively divide all secondary nodes in the low-voltage transformer area into one or more clusters based on channel quality data and delay data between all two secondary nodes that have a direct connection relationship in the low-voltage transformer area and with reference to the foregoing clustering criterion.

Figure 11A:
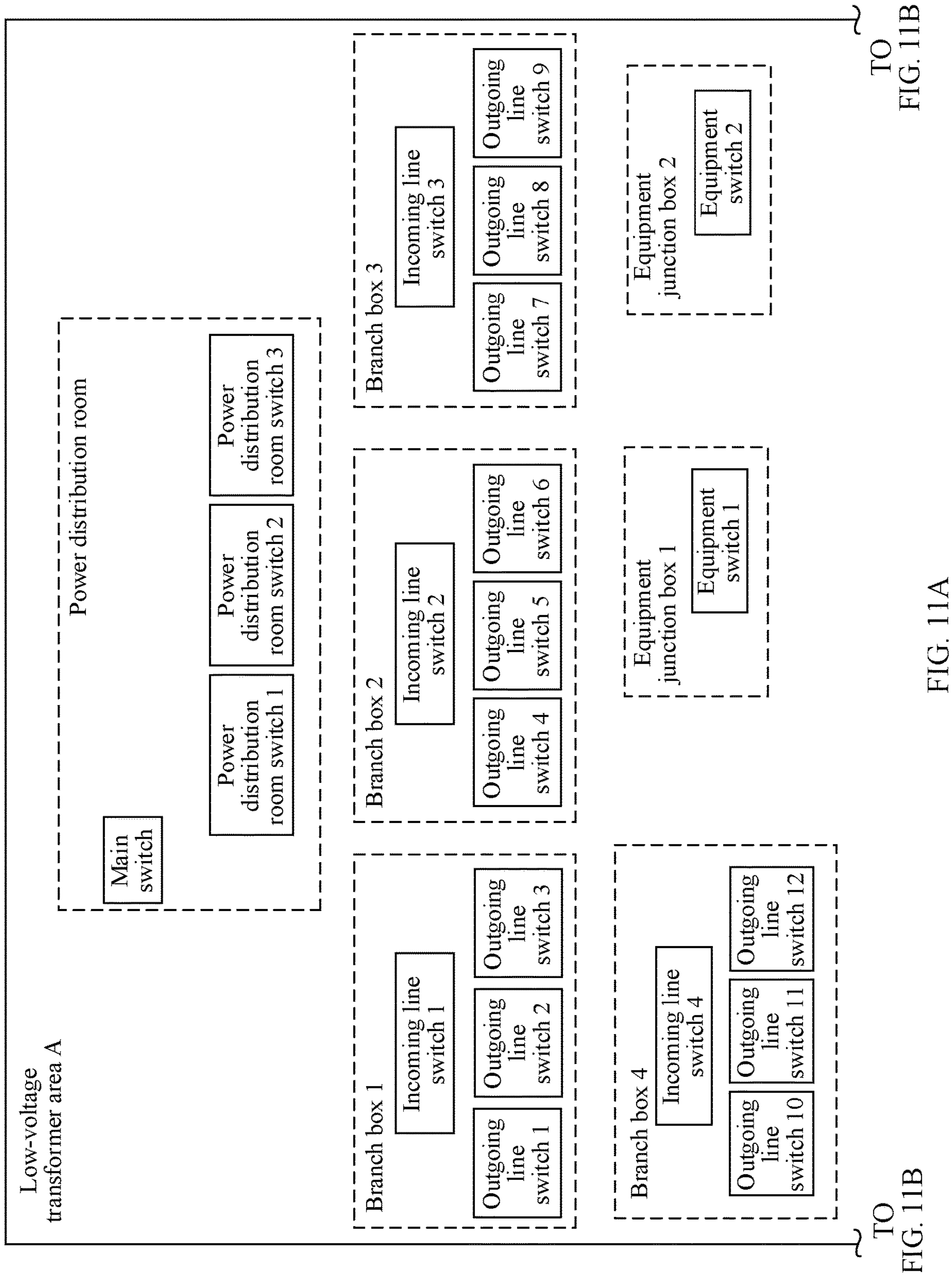
FIG. 11A and FIG. 11B are a schematic diagram of clusters included in the low-voltage transformer area A in FIG. 2.
Figure 11B:
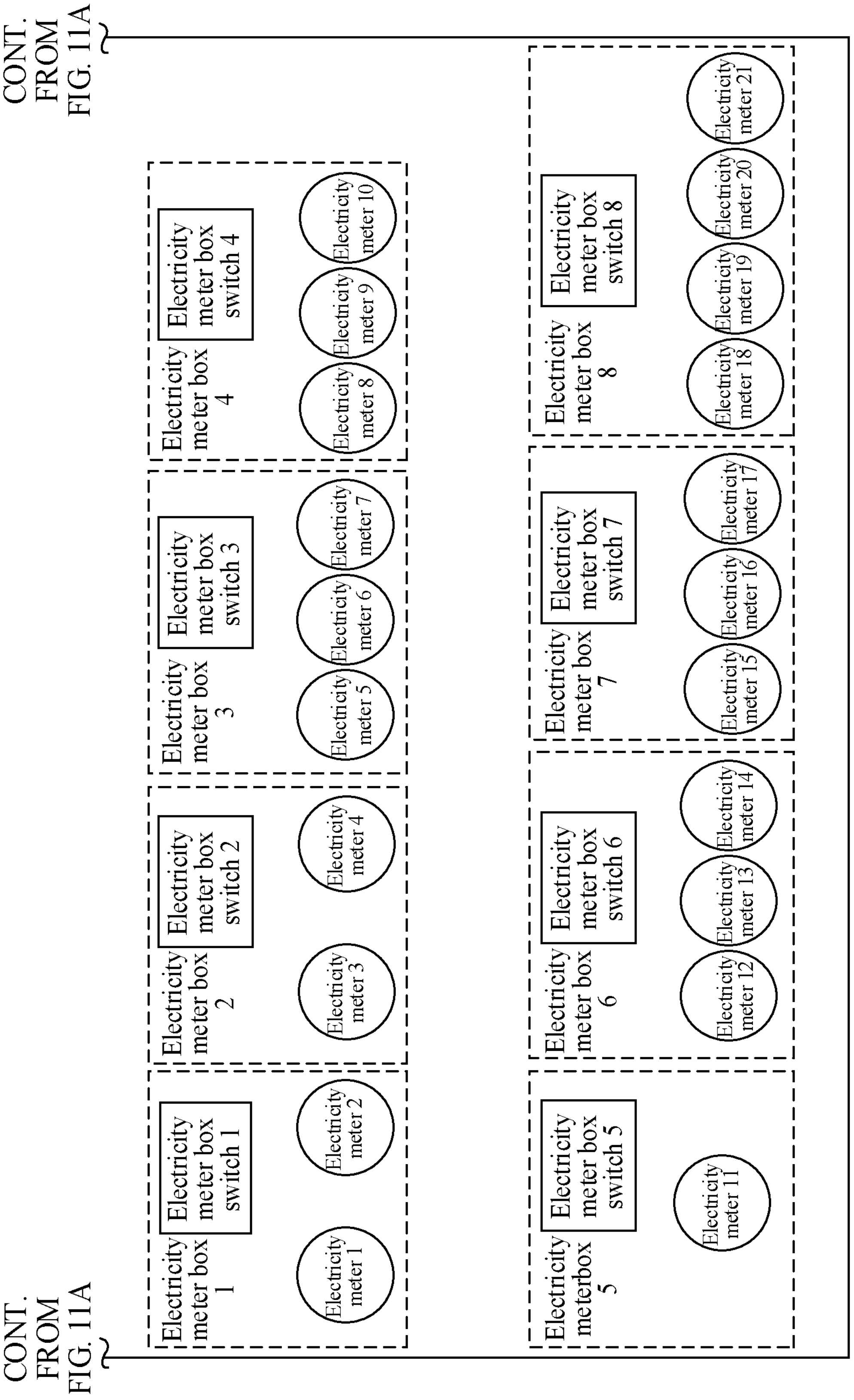

For example, FIG. 11A and FIG. 11B are a schematic diagram of clusters included in the low-voltage transformer area A in FIG. 2. As shown in FIG. 11A and FIG. 11B, a convergence terminal performs clustering analysis on obtained characteristic data between all two secondary nodes have a direct connection relationship in the low-voltage transformer area A, and obtained clusters in the low-voltage transformer area A include: a distribution room, a branch box 1 to a branch box 4, an equipment junction box 1, an equipment junction box 2, and an electricity meter box 1 to an electricity meter box 8. The power distribution room includes a main switch and a power distribution room switch 1 to a power distribution room switch 3, the branch box 1 includes an incoming line switch 1 and an outgoing line switch 1 to an outgoing line switch 3, the branch box 2 includes an incoming line switch 2 and an outgoing line switch 4 to an outgoing line switch 6, the branch box 3 includes an incoming line switch 3 and an outgoing line switch 7 to an outgoing line switch 9, the branch box 4 includes an incoming line switch 4 and an outgoing line switch 10 to an outgoing line switch 12, the equipment junction box 1 includes an equipment switch 1, the equipment junction box 2 includes an equipment switch 2, the electricity meter box 1 includes an electricity meter box switch 1, an electricity meter 1, and an electricity meter 2, the electricity meter box 2 includes an electricity meter box switch 2, an electricity meter 3, and an electricity meter 4, the electricity meter box 3 includes an electricity meter box switch 3 and an electricity meter 5 to an electricity meter 7, the electricity meter box 4 includes an electricity meter box switch 4 and an electricity meter 8 to an electricity meter 10, the electricity meter box 5 includes an electricity meter box switch 5 and an electricity meter 11, the electricity meter box 6 includes an electricity meter box switch 7 and an electricity meter 12 to an electricity meter 14, the electricity meter box 7 includes an electricity meter box switch 7 and an electricity meter 15 to an electricity meter 17, and the electricity meter box 8 includes an electricity meter box switch 8 and an electricity meter 18 to an electricity meter 21.

Step 1002: The primary node determines a connection relationship between different clusters based on the delay data and the at least one cluster.

In this step, the primary node may further determine, by using the foregoing obtained delay data between two secondary nodes that have a direct connection relationship in the low-voltage transformer area, the connection relationship between the clusters that are in the low-voltage transformer area and that are obtained through division in step 1001.

In a possible implementation, the step may include: the primary node performs statistical analysis based on the delay data to determine a distance between the different clusters. The primary node uses the distance between the different clusters as an input variable of a minimum spanning tree algorithm, to obtain the connection relationship between the different clusters.

The distance between the clusters may include a length of a power line connecting two clusters. For two nodes that have a direct connection relationship, if the two nodes belong to different clusters, a distance between the clusters in which the two nodes are located may be determined based on delay data between the two nodes. For example, if only one pair of nodes that have a direct connection relationship exists between two clusters, a distance between the two nodes may be determined by using delay data and a speed of light between the two nodes, and the distance may be further used as a distance between the two clusters. If there are a plurality of pairs of nodes that have a direct connection relationship between two clusters, that is, there are a plurality of groups of delay data, statistical analysis may be performed on the plurality of groups of delay data. For example, a group with a largest value may be selected from the plurality of groups of delay data, or averaging processing is performed on the plurality of groups of delay data, and so on. Then, a distance between the two clusters is determined by using a processing result and a speed of light. After the distance between the different clusters is obtained in the foregoing manner, the primary node may use the obtained distance between all two clusters as an input variable of a minimum spanning tree algorithm (for example, Kruskal Kruskal algorithm or Prim Prim algorithm), to quickly and accurately obtain the different clusters.

Figure 12:
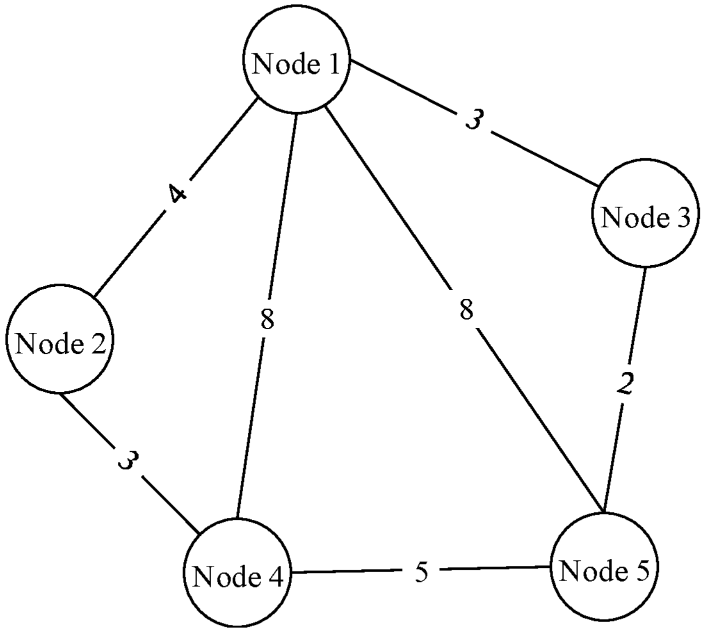
FIG. 12 is a schematic diagram of a principle of a minimum spanning tree algorithm.

For the minimum spanning tree algorithm, FIG. 12 is a schematic diagram of a principle of a minimum spanning tree algorithm. As shown in FIG. 12, it is assumed that there are five nodes. A direct or indirect path needs to be found between any two nodes. The direct path between the two nodes has one weight, that is, a number on a connection line between the two nodes in FIG. 12 represents the weight of the direct path, and the weight may be determined based on a length of the direct path between the two nodes. One of the five nodes is used as a root node. By using the minimum spanning tree algorithm, a connected subgraph with a smallest sum of weights (namely, the minimum spanning tree) may be resolved starting from the root node.

Figure 13:
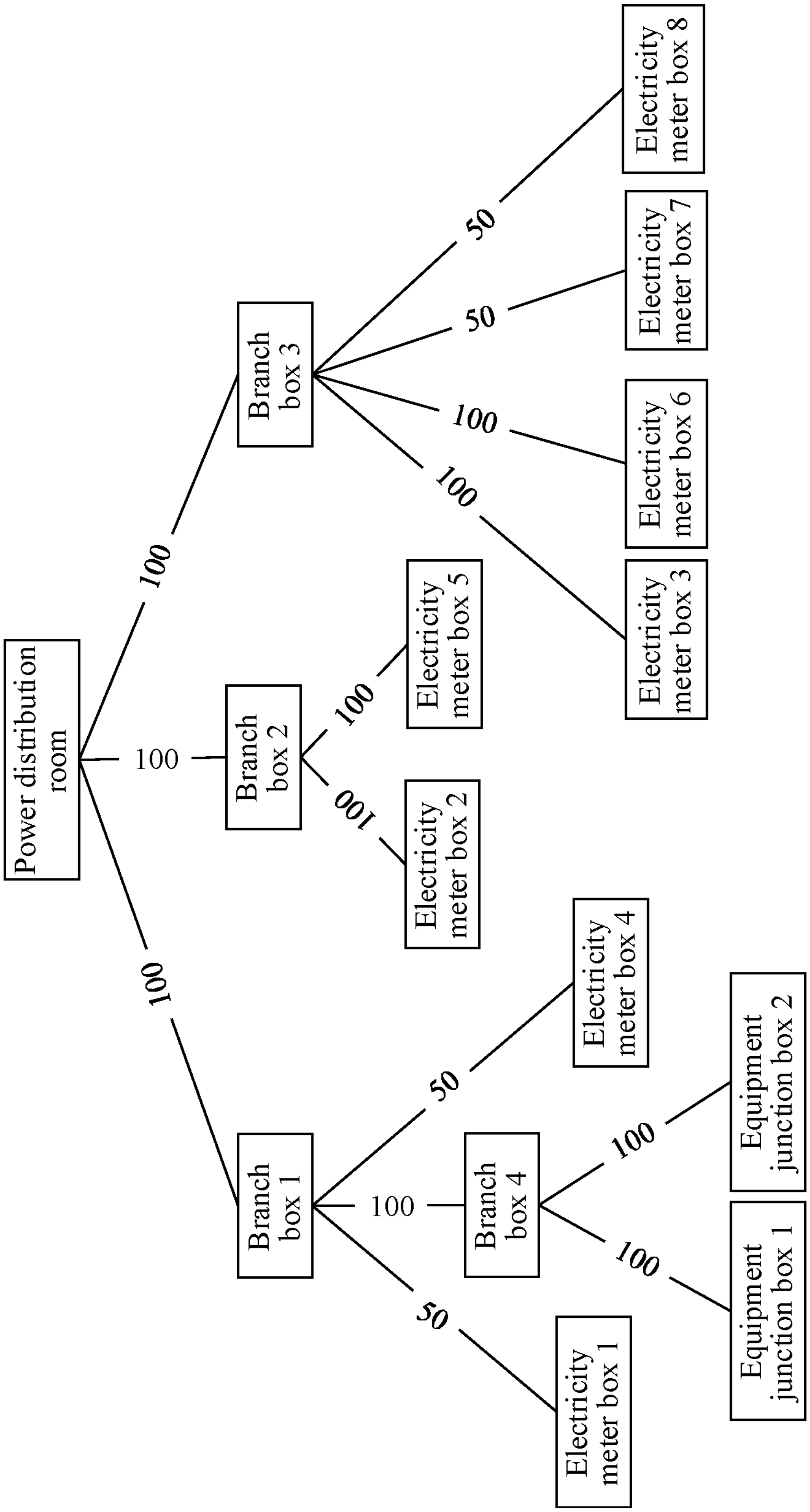
FIG. 13 is a schematic diagram of a connection relationship between different clusters in the low-voltage transformer area A in FIG. 11A and FIG. 11B.

For example, FIG. 13 is a schematic diagram of a connection relationship between different clusters in the low-voltage transformer area A in FIG. 11A and FIG. 11B. As shown in FIG. 13, a convergence terminal may determine a distance between any two clusters based on delay data between two nodes that have a direct connection relationship between the two clusters in FIG. 11A and FIG. 11B. For example, in FIG. 11A, the equipment switch 1 in the equipment junction box 1 and the incoming line switch 1 in the branch box 1 have a direct connection relationship, and a distance between the equipment junction box 1 and the branch box 1 may be determined based on delay data between the equipment switch 1 and the incoming line switch 1. For another example, in FIG. 11A, the incoming line switch 1 and the outgoing line switch 1 to the outgoing line switch 3 in the branch box 1 are each directly connected to the power distribution room switch 1 in the power distribution room, and a distance between the power distribution room and the branch box 1 may be determined based on delay data between the incoming line switch 1 and the outgoing line switch 1 to the outgoing line switch 3, and the power distribution room switch 1. After determining the distances between the power distribution room, the branch box 1 to the branch box 4, the equipment junction box 1 and the equipment junction box 2, and the electricity meter box 1 to the electricity meter box 8 in the low-voltage transformer area A, the convergence terminal uses these distances as input variables of the minimum spanning tree algorithm and designates a transformer as a root node. In this case, the minimum spanning tree shown in FIG. 13 may be obtained, that is, a connection relationship between different clusters in the low-voltage transformer area A is represented. In FIG. 13, a number on a connection line between two clusters represents a distance between the two clusters.

Step 1003: The primary node determines a node connection relationship between any two directly connected clusters based on the electric power data and the connection relationship between the different clusters.

The directly connected clusters represent two clusters directly connected through a power line. For example, in FIG. 13, the power distribution room and the branch box 1 are two directly connected clusters, and the power distribution room and the electricity meter box 2 are not directly connected clusters. Determining the node connection relationship between the two directly connected clusters may include determining which nodes in the two directly connected clusters are directly connected through the power line between the two directly connected clusters. For example, with reference to FIG. 11A and FIG. 13, the power distribution room and the branch box 1 are directly connected clusters, and a node connection relationship between the power distribution room and the branch box 1 is determined. This may include determining which switch of the incoming line switch 1 and the outgoing line switch 1 to the outgoing line switch 3 in the branch box 1 is directly connected to at least one of the main switch and the distribution room switch 1 to the distribution room switch 3 in the power distribution room through a power line between the power distribution room and the branch box 1.

In this step, the primary node may determine the directly connected clusters in the low-voltage transformer area based on the foregoing determined connection relationship between the different clusters. For any two directly connected clusters, the primary node may perform matching, based on electric power data synchronously collected by nodes in the two directly connected clusters, on a quantity relationship between the electric power data, and determine which nodes in the two directly connected clusters are directly connected through a power line between the two directly connected clusters. When the electric power data synchronously collected by the nodes is used, synchronization, accuracy, and differentiation of the electric power data are higher. This effectively improves effectiveness and accuracy of electric power data matching, and the node connection relationship between the two directly connected clusters can be more accurately determined.

Figure 14A:
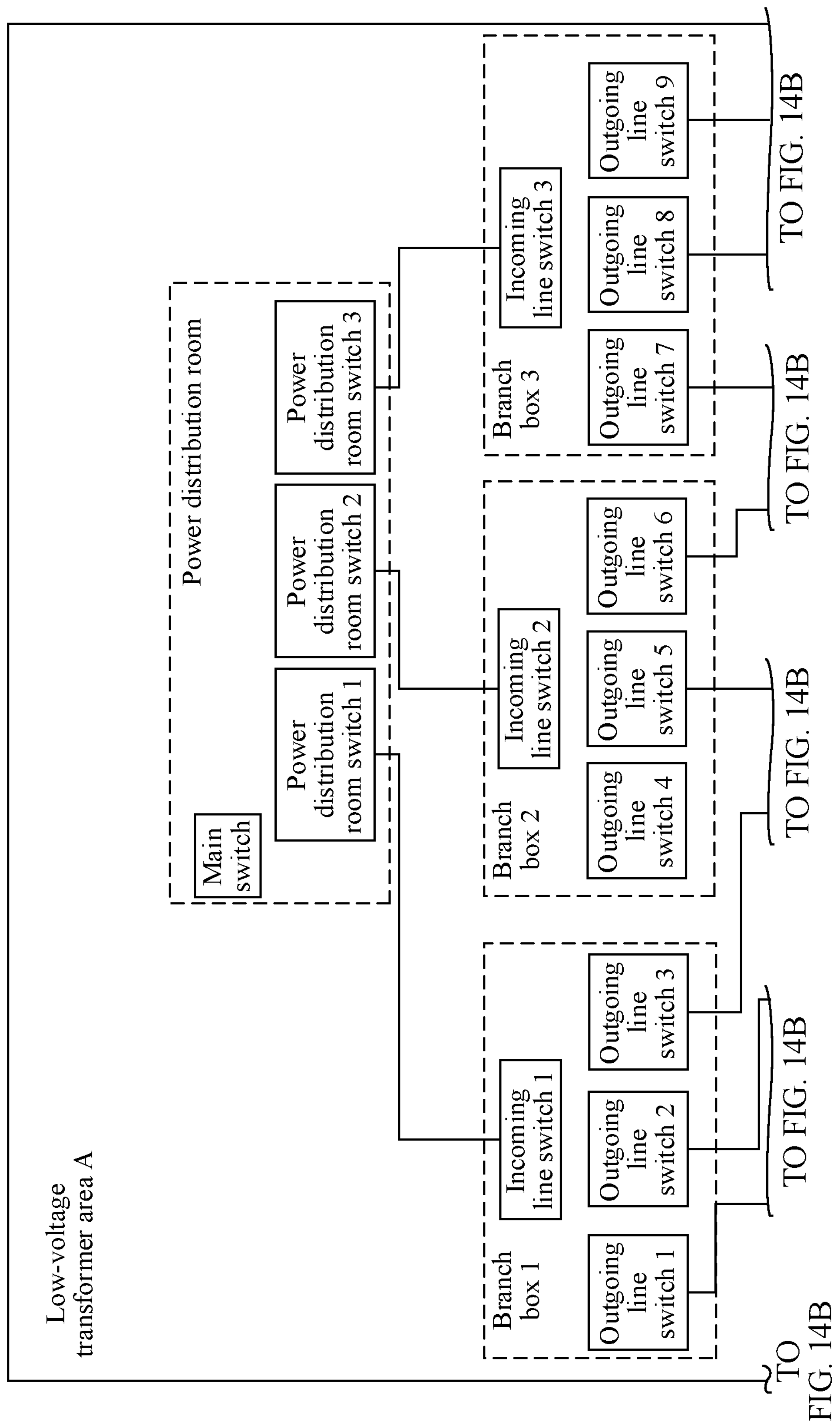
FIG. 14A and FIG. 14B are a schematic diagram of a node connection relationship between directly connected clusters in the low-voltage transformer area A in FIG. 13.
Figure 14B:
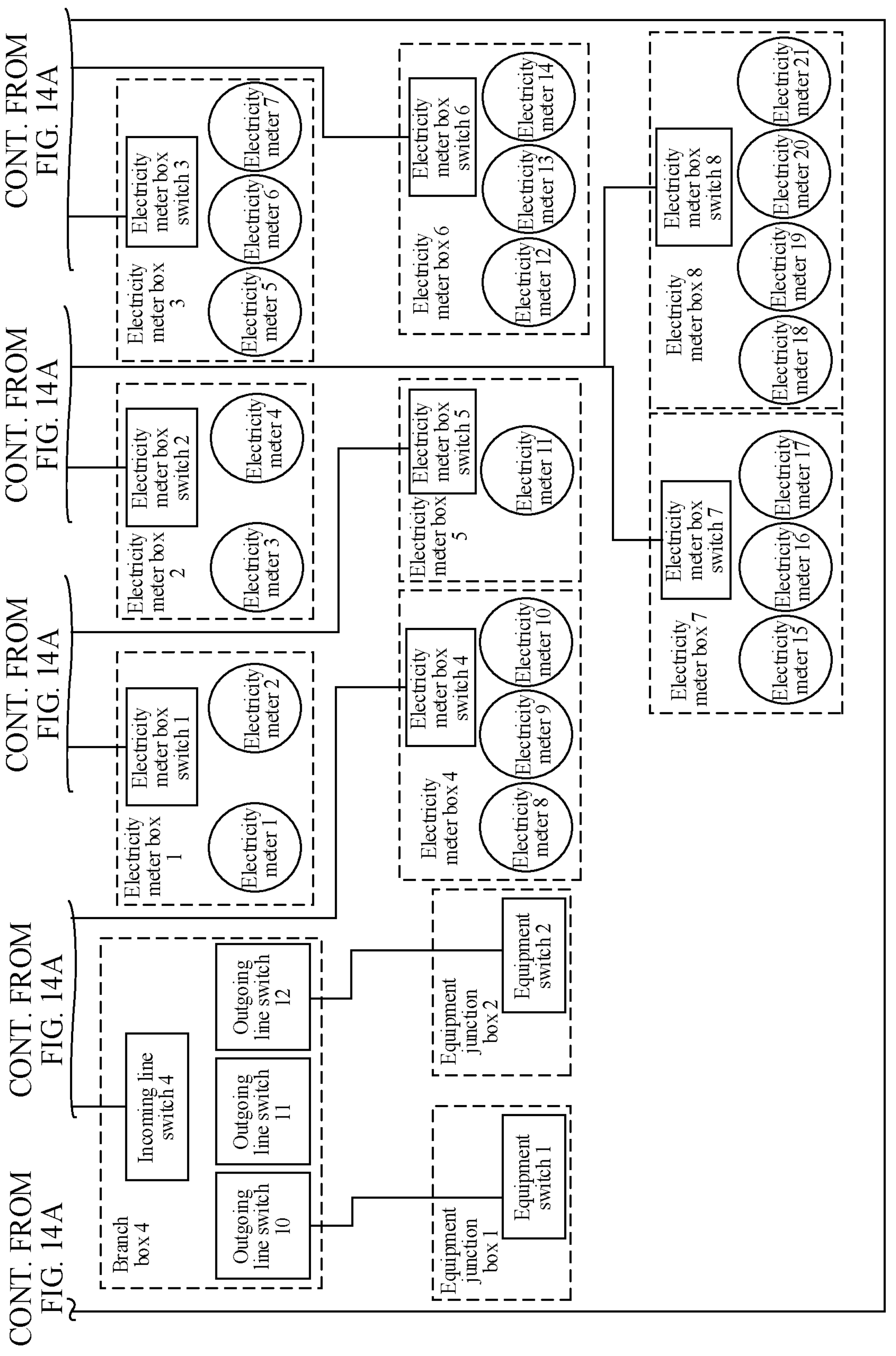

For example, nodes with a same electric power data value, that is, the nodes directly connected through the power line between the two directly connected clusters, may be determined based on electric power data of nodes in the two directly connected clusters. For example, with reference to FIG. 11A and FIG. 13, matching is performed based on electric power data of the main switch and the power distribution room switch 1 to the power distribution room switch 3 in the power distribution room and the incoming line switch 1 and the outgoing line switch 1 to the outgoing line switch 3 in the branch box 1. Because the electric power data of the power distribution room switch 1 in the power distribution room is equal to the electric power data of the incoming line switch 1 in the branch box 1, it may be determined that the power distribution room switch 1 and the incoming line switch 1 are directly connected through a power line. In this way, the node connection relationship between the any two directly connected clusters in the low-voltage transformer area A in FIG. 13 may be obtained by using the electric power data of the nodes in the low-voltage transformer area A. FIG. 14A and FIG. 14B are a schematic diagram of a node connection relationship between directly connected clusters in the low-voltage transformer area A in FIG. 13. As shown in FIG. 14A and FIG. 14B, it may be learned which nodes are directly connected between any two direct clusters in the power distribution room, the branch box 1 to the branch box 4, the equipment junction box 1, the equipment junction box 2, and the electricity meter box 1 to the electricity meter box 8.

Step 1004: The primary node determines a connection relationship between nodes in each cluster based on the electric power data.

Determining the connection relationship between the nodes in each cluster may include determining a hierarchical relationship between nodes that are directly connected through a power line and that are in a same cluster. For example, two levels of nodes, namely, a parent node and a subnode, may exist in the same cluster. For example, in FIG. 11A, for the branch box 1, determining a connection relationship between nodes in the branch box 1 may include determining a hierarchical relationship between any two nodes that are directly connected through a power line and that are in the incoming line switch 1, the outgoing line switch 1, the outgoing line switch 2, and the outgoing line switch 3.

In this step, the primary node may perform matching on a quantity relationship between the electric power data based on the electric power data synchronously collected by the nodes in the same cluster, and determine a hierarchical relationship between two nodes that are in the same cluster and that are directly connected through a power line. When the electric power data synchronously collected by the nodes is used, synchronization, accuracy, and differentiation of the electric power data are higher. This effectively improves effectiveness and accuracy of electric power data matching, and the connection relationship between the nodes in each cluster can be more accurately determined.

Figure 15A:
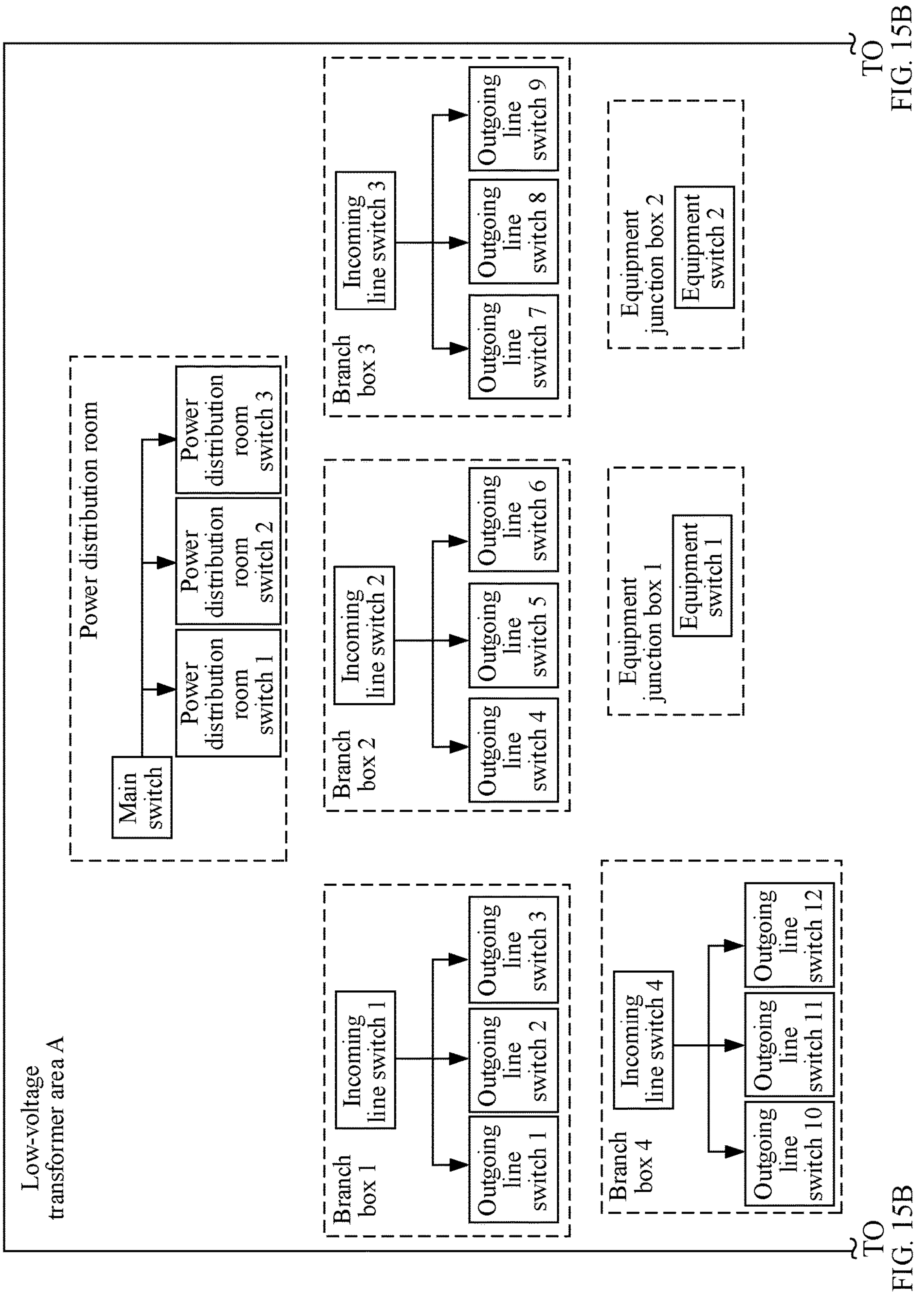
FIG. 15A and FIG. 15B are a schematic diagram of a connection relationship between nodes in each cluster in the low-voltage transformer area A in FIG. 13.
Figure 15B:
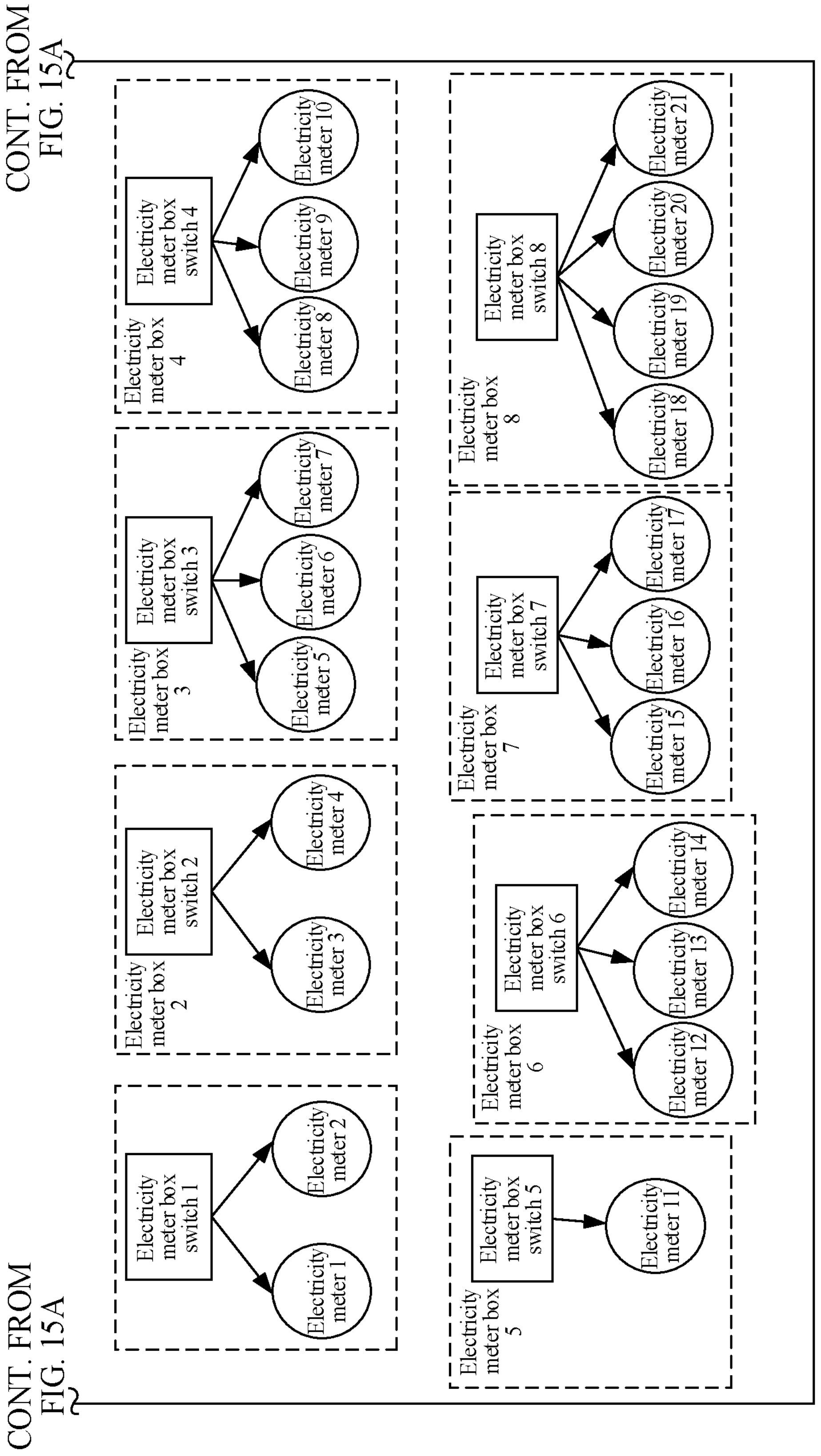

For example, the electric power data is electric energy. According to electric energy of the nodes in the same cluster in a same time period, if an electric energy increment of one node is a sum of electric energy increments of one or more other nodes, the node is directly connected to the one or more other nodes through a power line, and is a parent node of the one or more other nodes. For example, in FIG. 11A, two levels of nodes, namely, a parent node and a subnode, exist in a same branch box. Matching is performed based on electric energy of the incoming line switch 1 and the outgoing line switch 1 to the outgoing line switch 3 in the branch box 1. Because an electric energy increment of the incoming line switch 1 is a sum of electric energy increments of the outgoing line switch 1 to the outgoing line switch 3 in a same time period, it may be determined that the incoming line switch 1 is directly connected to the outgoing line switch 1 to the outgoing line switch 3 separately through a power line, and the incoming line switch 1 is a parent node of the outgoing line switch 1 to the outgoing line switch 3. In this way, the connection relationship between the nodes in each cluster may be obtained by using the electric power data collected by the nodes in the low-voltage transformer area A. FIG. 15A and FIG. 15B are a schematic diagram of a connection relationship between nodes in each cluster in the low-voltage transformer area A in FIG. 13. As shown in FIG. 15A and FIG. 15B, a connection relationship between nodes in any cluster of a power distribution room, a branch box 1 to a branch box 4, an equipment junction box 1, an equipment junction box 2, and an electricity meter box 1 to an electricity meter box 8 may be learned.

It should be noted that, a sequence in which the primary node performs step 1004 may be before step 1002 or step 1003 or may be after step 1002 or step 1003, or step 1003 and step 1004 may be simultaneously performed. This is not limited in this embodiment of this disclosure.

Step 1005: The primary node identifies the topology of the low-voltage transformer area based on a connection relationship between different clusters, a connection relationship between nodes in each cluster, and a node connection relationship between any two directly connected clusters.

In this step, the primary node may determine a connection relationship between secondary nodes or a connection relationship between nodes in the low-voltage transformer area based on the connection relationship between the different clusters, the connection relationship between nodes in each cluster, and the node connection relationship between any two directly connected clusters that are determined in step 1002 to step 1004, to identify the topology of the low-voltage transformer area.

Figure 16A:
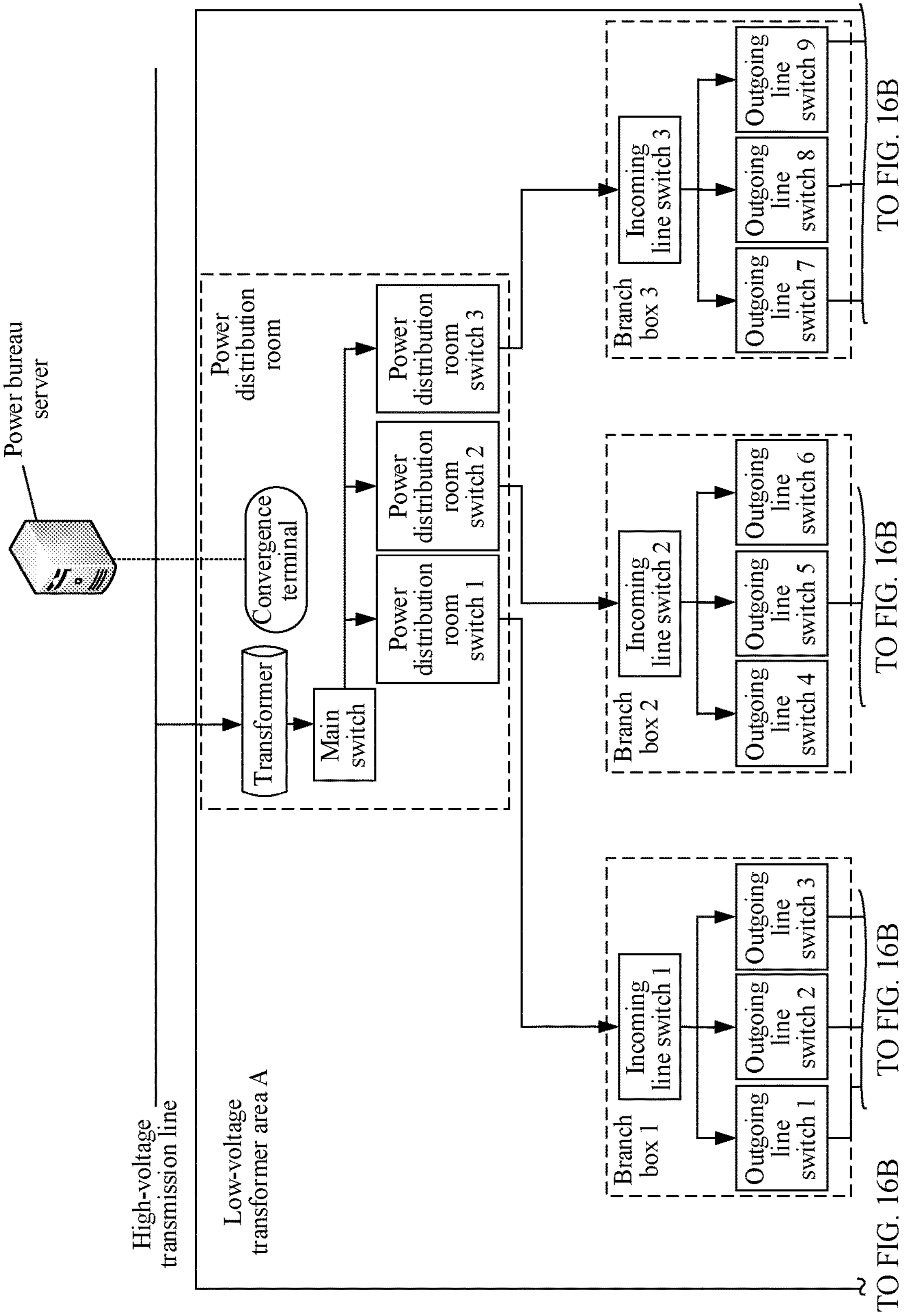
FIG. 16A and FIG. 16B are a schematic diagram of a topology of the low-voltage transformer area A in FIG. 2.
Figure 16B:
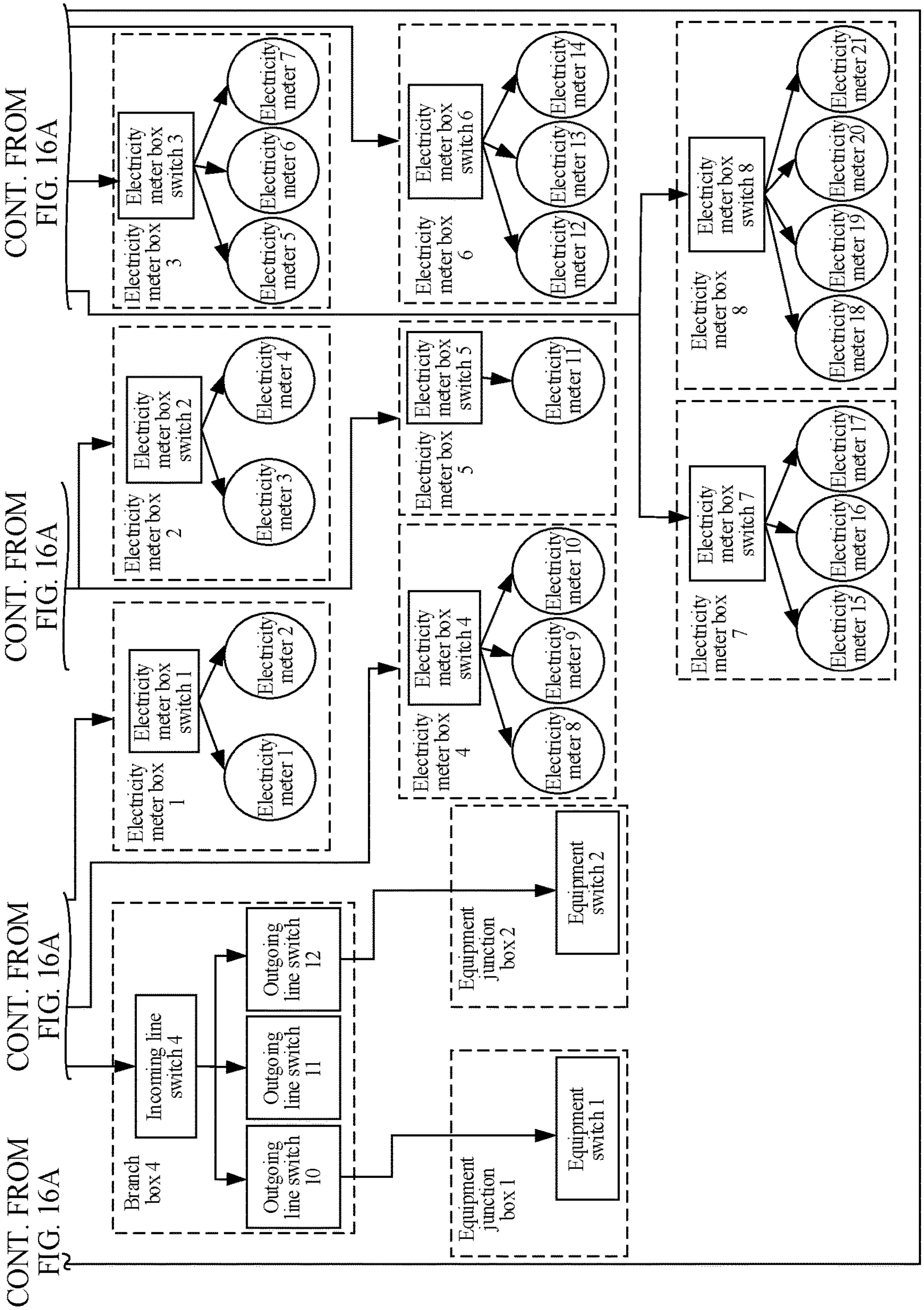

For example, FIG. 16A and FIG. 16B are a schematic diagram of a topology of the low-voltage transformer area A in FIG. 2. As shown in FIG. 16A and FIG. 16B, the topology of the low-voltage transformer area A includes: a connection relationship between a convergence terminal, a main switch, a power distribution room switch 1 to a power distribution room switch 3, an incoming line switch 1 to an incoming line switch 4, an outgoing line switch 1 to an outgoing line switch 12, an equipment switch 1, an equipment switch 2, an electricity meter box switch 1 to an electricity meter box switch 8, and an electricity meter 1 to an electricity meter 21.

In this embodiment of this disclosure, the cluster analysis is performed based on at least one of the delay data or the channel quality data, to determine the cluster in the low-voltage transformer area. Further, the connection relationship between the different clusters is determined based on the delay data, and the node connection relationship between the two directly connected clusters and the connection relationship between the nodes in each cluster are determined based on the electric power data, to identify the topology of the low-voltage transformer area. The electric power data may be electric power data collected by the nodes at a same network time base, and the electric power data has high synchronization, accuracy, and differentiation, so that the node connection relationship between the two directly connected clusters and the connection relationship between the nodes in each cluster can be more accurately determined, thereby further improving accuracy of topology identification of the low-voltage transformer area.

In a possible implementation, step 302 may further include: The primary node performs data analysis on at least one of the delay data, the channel quality data, or the electric power data by using an intelligent algorithm, to identify the topology of the low-voltage transformer area.

The intelligent algorithm may include: at least one of an artificial neural network algorithm, a genetic algorithm, a simulated annealing algorithm, an ant colony algorithm, or a particle swarm optimization algorithm, or may include a combination of the foregoing plurality of algorithms, and a model obtained through training based on an algorithm, big data, and the like.

For example, the primary node may use at least one of the obtained delay data, channel quality data, or electric power data as an input variable of the intelligent algorithm, perform data analysis on the input variable by using the intelligent algorithm, and output a processing result, where the processing result can represent the connection relationship between the nodes in the low-voltage transformer area, so that the topology of the low-voltage transformer area is identified. The processing result may include information about each node, and information about one node may include a parent node of the node, a cluster to which the node belongs, a length of a power line connected between the node and the parent node, and the like. For example, a neural network model may be pre-trained by using the artificial neural network algorithm and a large amount of delay data, and the primary node may input the obtained delay data to the trained neural network model, to output the foregoing processing result. For another example, the primary node may input the obtained delay data, channel quality data, and electric power data to the intelligent algorithm, and output the foregoing processing result through cluster analysis.

In this embodiment of this disclosure, data analysis may be performed based on at least one of the delay data, the channel quality data, or the electric power data by using the intelligent algorithm, to identify the topology of the low-voltage transformer area.

Based on a same disclosure concept of the foregoing method embodiment, an embodiment of this disclosure further provides an apparatus for identifying a topology of a power line low-voltage transformer area. The apparatus for identifying a topology of a power line low-voltage transformer area may be configured to perform the technical solutions described in the foregoing method embodiment.

Figure 17:
FIG. 17 is a schematic diagram of a structure of an apparatus for identifying a topology of a power line low-voltage transformer area according to an embodiment of this disclosure.

FIG. 17 is a schematic diagram of a structure of an apparatus for identifying a topology of a power line low-voltage transformer area according to an embodiment of this disclosure. As shown in FIG. 17, the low-voltage transformer area includes a plurality of nodes, and the plurality of nodes include a primary node and a plurality of secondary nodes corresponding to the primary node. The apparatus may be the primary node, and the apparatus may include: an obtaining module 1701, configured to obtain characteristic data, where the characteristic data includes: first characteristic data between any two secondary nodes that have a direct connection relationship in the plurality of secondary nodes in the low-voltage transformer area; an identification module 1702, configured to identify the topology of the low-voltage transformer area based on the characteristic data, where the characteristic data includes at least one of delay data or channel quality data, the delay data is a first delay for transmitting information on a power line between the two nodes that have a direct connection relationship, and the channel quality data is quality of a power line channel between the two nodes that have a direct connection relationship.

In a possible implementation, the characteristic data further includes: second characteristic data between the primary node and a secondary node that is in the low-voltage transformer area and that is in a direct connection relationship with the primary node. The obtaining module 1701 is further configured to: send indication information to a first secondary node, where the indication information indicates the first secondary node to report the characteristic data; and receive the first characteristic data and the second characteristic data that are reported by the first secondary node; or send the indication information to the first secondary node; receive the first characteristic data reported by the first secondary node; and measure the second characteristic data.

In a possible implementation, at least one physical phase is included between the two nodes that have a direct connection relationship in the low-voltage transformer area, and the characteristic data between the two nodes includes: two pieces of characteristic data that have a same physical phase between the two nodes.

In a possible implementation, the obtaining module 1701 is further configured to: obtain electric power data of the nodes in the low-voltage transformer area, where the electric power data includes: at least one of a voltage, a current, power, a power factor, a phase angle, waveform distortion of the voltage, waveform distortion of the current, power frequency, electric energy, a maximum demand, a load record, or an event record collected by the nodes in the low-voltage transformer area at a same network time base.

In a possible implementation, the first delay between the two nodes that have a direct connection relationship in the low-voltage transformer area is determined based on moments at which the two nodes send information, moments at which the two nodes receive information, and internal delays. The two nodes include a first node, the first node is coupled to a first end of the power line, and sends first information and receives second information through the power line, and an internal delay of the first node includes a second delay between a moment at which the first node sends the first information and a moment at which the first information arrives at the first end of the power line, and a third delay between a moment at which the second information arrives at the first end of the power line and a moment at which the first node receives the second information.

In a possible implementation, the obtaining module 1701 is further configured to: send, by the primary node, a first packet to a target secondary node that is in the low-voltage transformer area and that has a direct connection relationship with the primary node, and determine a moment at which the first packet is sent; receive, by the primary node, a second packet sent by the target secondary node, and determine a moment at which the second packet is received, where the second packet includes an internal delay of the target secondary node, a moment at which the target secondary node receives the first packet, and a moment at which the target secondary node sends the second packet; and determine, by the primary node, a first delay between the primary node and the target secondary node based on the moment at which the primary node sends the first packet, the moment at which the primary node receives the second packet, the moment at which the target secondary node receives the first packet, the moment at which the target secondary node sends the second packet, the internal delay of the target secondary node, and an internal delay of the primary node.

In a possible implementation, the obtaining module 1701 is further configured to: send, by the primary node, a first packet to a target secondary node, and determine a moment at which the first packet is sent; receive, by the primary node, a third packet sent by the target secondary node, and determine a moment at which the third packet is received; send, by the primary node, a fourth packet to the target secondary node; receive, by the primary node, a fifth packet sent by the target secondary node, where the fifth packet includes: an internal delay of the target secondary node, a moment at which the target secondary node receives the first packet, and a moment at which the target secondary node sends the third packet; and determine, by the primary node, a first delay between the primary node and the target secondary node based on the moment at which the primary node sends the first packet, the moment at which the primary node receives the third packet, an internal delay of the primary node, the internal delay of the target secondary node, the moment at which the target secondary node receives the first packet, and the moment at which the target secondary node sends the third packet.

In a possible implementation, the obtaining module 1701 is further configured to: send, by the primary node, a first packet to a target secondary node, and determine a moment at which the first packet is sent; receive, by the primary node, a sixth packet sent by the target secondary node, and determine a moment at which the sixth packet is received, where the sixth packet includes first delay data, and the first delay data includes some data of an internal delay of the target secondary node, a moment at which the target secondary node receives the first packet, and a moment at which the target secondary node sends the sixth packet; send, by the primary node, a seventh packet to the target secondary node; receive, by the primary node, an eighth packet sent by the target secondary node, where the eighth packet includes second delay data, and the second delay data is other data other than the first delay data in the internal delay of the target secondary node, the moment at which the target secondary node receives the first packet, and the moment at which the target secondary node sends the sixth packet; and determine, by the primary node, a first delay between the primary node and the target secondary node based on the moment at which the primary node sends the first packet, the moment at which the primary node receives the sixth packet, an internal delay of the primary node, the internal delay of the target secondary node, the moment at which the target secondary node receives the first packet, and the moment at which the target secondary node sends the sixth packet.

In a possible implementation, the identification module 1702 is further configured to: perform cluster analysis based on at least one of the delay data or the channel quality data, to determine at least one cluster, where delay data between nodes in a same cluster meets a first preset condition, and/or channel quality data between the nodes in the same cluster meets a second preset condition; determine a connection relationship between different clusters based on the delay data and the at least one cluster; determine a node connection relationship between any two directly connected clusters based on the electric power data and the connection relationship between the different clusters; determine a connection relationship between nodes in each cluster based on the electric power data; and identify the topology of the low-voltage transformer area based on the connection relationship between the different clusters, the connection relationship between the nodes in each cluster, and the node connection relationship between the any two directly connected clusters.

In a possible implementation, the identification module 1702 is further configured to: perform statistical analysis based on the delay data, to determine a distance between the different clusters; and use the distance between the different clusters as an input variable of a minimum spanning tree algorithm, to obtain the connection relationship between the different clusters.

In a possible implementation, the identification module 1702 is further configured to: perform data analysis on at least one of the delay data, the channel quality data, or the electric power data by using an intelligent algorithm, to identify the topology of the low-voltage transformer area, where the intelligent algorithm includes: at least one of an artificial neural network algorithm, a genetic algorithm, a simulated annealing algorithm, an ant colony algorithm, or a particle swarm optimization algorithm.

In a possible implementation, the channel quality data further includes: quality of a radio channel between the two nodes that have a direct connection relationship in the low-voltage transformer area.

In a possible implementation, the first characteristic data reported by the first secondary node includes: a first delay for transmitting information through a power line between the first secondary node and a second secondary node that has a direct connection relationship with the first secondary node and that is in the low-voltage transformer area, and quality of a power line channel between the first secondary node and the second secondary node.

In this embodiment of this disclosure, for specific descriptions and technical effects of the apparatus for identifying a topology of a power line low-voltage transformer area and various possible implementations thereof, refer to the foregoing related descriptions. Details are not described herein again.

Figure 18:
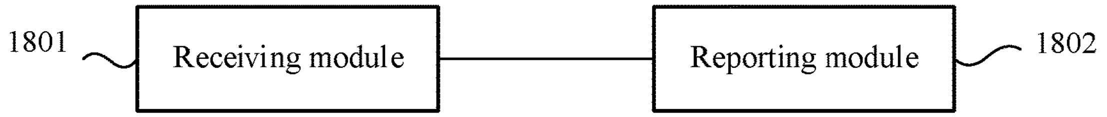
FIG. 18 is a schematic diagram of a structure of another apparatus for identifying a topology of a power line low-voltage transformer area according to an embodiment of this disclosure.

FIG. 18 is a schematic diagram of a structure of another apparatus for identifying a topology of a power line low-voltage transformer area according to an embodiment of this disclosure. As shown in FIG. 18, the low-voltage transformer area includes a plurality of nodes, the plurality of nodes include a primary node and a plurality of secondary nodes corresponding to the primary node, and the plurality of secondary nodes include a first secondary node. The apparatus may be the first secondary node, and the apparatus may include: a receiving module 1801, configured to receive indication information sent by the primary node; a reporting module 1802, configured to report characteristic data in response to the indication information, where the characteristic data includes: first characteristic data between any two secondary nodes that have a direct connection relationship in the plurality of secondary nodes in the low-voltage transformer area; the characteristic data is used by the primary node to identify the topology of the low-voltage transformer area; and the characteristic data includes at least one of delay data or channel quality data, the delay data is a first delay for transmitting information on a power line between the two nodes that have a direct connection relationship, and the channel quality data is quality of a power line channel between the two nodes that have a direct connection relationship.

In a possible implementation, the characteristic data further includes: second characteristic data between the primary node and a secondary node that is in the low-voltage transformer area and that is in a direct connection relationship with the primary node.

In a possible implementation, at least one physical phase is included between the two nodes that have a direct connection relationship in the low-voltage transformer area, and the characteristic data between the two nodes includes: two pieces of characteristic data that have a same physical phase between the two nodes.

In a possible implementation, the reporting module 1802 is further configured to: report electric power data in response to the indication information, where the electric power data includes: at least one of a voltage, a current, power, a power factor, a phase angle, waveform distortion of the voltage, waveform distortion of the current, power frequency, electric energy, a maximum demand, a load record, or an event record collected by the first secondary node at a preset network time base NTB.

In a possible implementation, the first delay between the two nodes that have a direct connection relationship in the low-voltage transformer area is determined based on moments at which the two nodes send information, moments at which the two nodes receive information, and internal delays. When the two nodes include a first node, and the first node is coupled to a first end of the power line, and sends first information and receives second information through the power line, an internal delay of the first node includes a second delay between a moment at which the first node sends the first information and a moment at which the first information arrives at the first end of the power line, and a third delay between a moment at which the second information arrives at the first end of the power line and a moment at which the first node receives the second information.

In a possible implementation, the apparatus further includes a measurement module, configured to: send, by the first secondary node, a first packet to a target node that is in the low-voltage transformer area and that has a direct connection relationship with the first secondary node, and determine a moment at which the first packet is sent; receive, by the first secondary node, a second packet sent by the target node, and determine a moment at which the second packet is received, where the second packet includes an internal delay of the target node, a moment at which the target node receives the first packet, and a moment at which the target node sends the second packet; and determine, by the first secondary node, a first delay between the first secondary node and the target node based on the moment at which the first secondary node sends the first packet, the moment at which the first secondary node receives the second packet, the moment at which the target node receives the first packet, the moment at which the target node sends the second packet, the internal delay of the target node, and the internal delay of the first secondary node.

In a possible implementation, the measurement module is further configured to: send, by the first secondary node, a first packet to a target node, and determine a moment at which the third packet is sent; receive, by the first secondary node, the third packet sent by the target node, and determine a moment at which the third packet is received; send, by the first secondary node, a fourth packet to the target node; receive, by the first secondary node, a fifth packet sent by the target node, where the fifth packet includes: an internal delay of the target node, a moment at which the target node receives the first packet, and a moment at which the target node sends the third packet; and determine, by the first secondary node, a first delay between the first secondary node and the target node based on the moment at which the first secondary node sends the first packet, the moment at which the first secondary node receives the third packet, an internal delay of the first secondary node, the internal delay of the target node, the moment at which the target node receives the first packet, and the moment at which the target node sends the third packet.

In a possible implementation, the measurement module is further configured to: send, by the first secondary node, a first packet to a target node, and determine a moment at which the first packet is sent; receive, by the first secondary node, a sixth packet sent by the target node, and determine a moment at which the sixth packet is received, where the sixth packet includes first delay data, and the first delay data includes some data of an internal delay of the target node, a moment at which the target node receives the first packet, and a moment at which the target node sends the sixth packet; send, by the first secondary node, a seventh packet to the target node; receive, by the first secondary node, an eighth packet sent by the target node, where the eighth packet includes second delay data, and the second delay data is other data other than the first delay data in the internal delay of the target node, the moment at which the target node receives the first packet, and the moment at which the target node sends the sixth packet; and determine, by the first secondary node, a first delay between the first secondary node and the target node based on the moment at which the first secondary node sends the first packet, the moment at which the first secondary node receives the sixth packet, an internal delay of the first secondary node, the internal delay of the target node, the moment at which the target node receives the first packet, and the moment at which the target node sends the sixth packet.

In a possible implementation, the channel quality data further includes: quality of a radio channel between the two nodes that have a direct connection relationship in the low-voltage transformer area.

In a possible implementation, the characteristic data reported by the first secondary node includes: a first delay for transmitting information through a power line between the first secondary node and a second secondary node that has a direct connection relationship with the first secondary node and that is in the low-voltage transformer area, and quality of a power line channel between the first secondary node and the second secondary node.

In a possible implementation, the channel quality data includes: at least one of a signal attenuation value, signal strength, or a signal-to-noise ratio.

In this embodiment of this disclosure, for specific descriptions and technical effects of the apparatus for identifying a topology of a power line low-voltage transformer area and various possible implementations thereof, refer to the foregoing related descriptions. Details are not described herein again.

An embodiment of this disclosure provides another apparatus for identifying a topology of a power line low-voltage transformer area. The apparatus may include: a processor and a transmission interface, where the processor receives or sends data through the transmission interface. The processor is configured to implement the method for identifying a topology of a power line low-voltage transformer area in any one of the foregoing embodiments when executing instructions stored in a memory.

Figure 19:
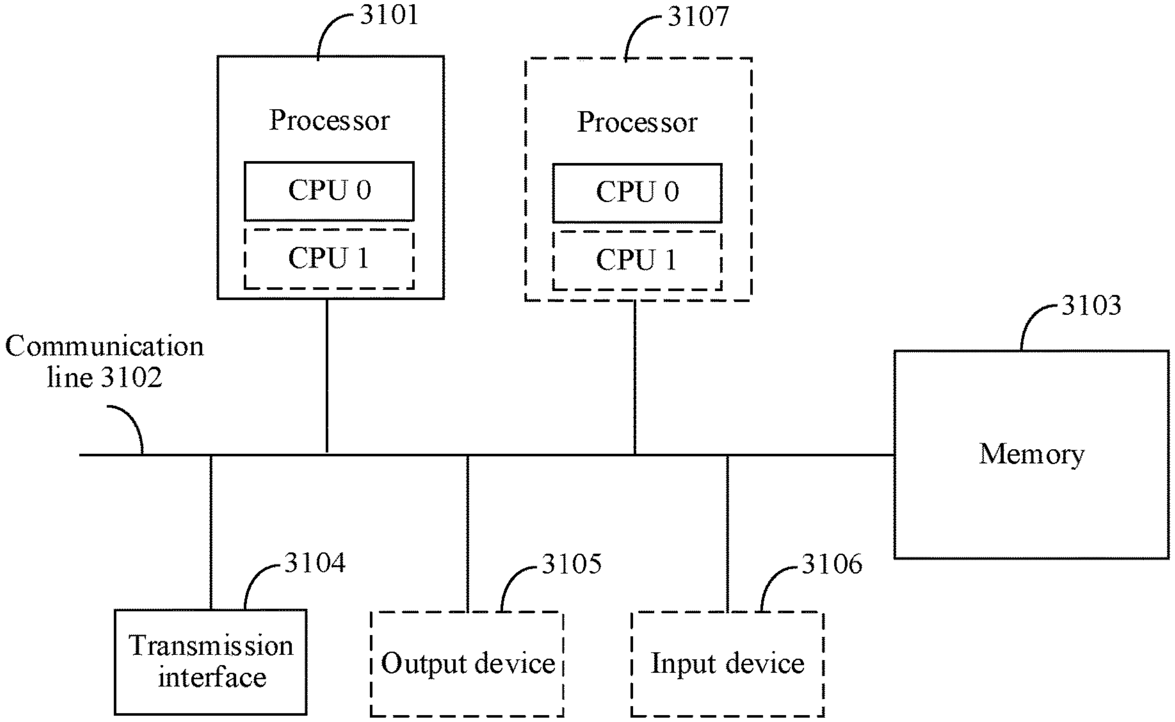
FIG. 19 is a schematic diagram of a structure of another apparatus for identifying a topology of a power line low-voltage transformer area according to an embodiment of this disclosure.

FIG. 19 is a schematic diagram of a structure of another apparatus for identifying a topology of a power line low-voltage transformer area according to an embodiment of this disclosure. As shown in FIG. 19, the apparatus may include: at least one processor 3101, a communication line 3102, a memory 3103, and at least one transmission interface 3104.

The processor 3101 may be a general-purpose central processing unit (CPU), a microprocessor, an application-specific integrated circuit (ASIC), or one or more integrated circuits configured to control program execution of the solutions in this disclosure.

The communication line 3102 may include a path for transmitting information between the foregoing components.

The transmission interface 3104 is configured to communicate, by using any apparatus such as a transceiver, with another device or a communication network, for example, an ethernet, a RAN, a PLC network, or a wireless local area network (WLAN).

The memory 3103 may be a read-only memory (ROM) or another type of static storage device that can store static information and instructions, or a random-access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 3103 is not limited thereto. The memory may exist independently and is connected to the processor through the communication line 3102. Alternatively, the memory may be integrated into the processor. The memory provided in this embodiment of this disclosure may usually be non-volatile. The memory 3103 is configured to store computer-executable instructions for executing the solutions of this disclosure, and the processor 3101 controls the execution. The processor 3101 is configured to execute the computer-executable instructions stored in the memory 3103, to implement the method provided in any one of the foregoing embodiments of this disclosure.

Optionally, the computer-executable instructions in this embodiment of this disclosure may also be referred to as application program code. This is not specifically limited in this embodiment of this disclosure.

In specific implementation, in an embodiment, the processor 3101 may include one or more CPUs, for example, a CPU 0 and a CPU 1 in FIG. 19.

In specific implementation, in an embodiment, the communication apparatus may include a plurality of processors, for example, the processor 3101 and a processor 3107 in FIG. 19. Each of these processors may be a single-core processor (single-CPU), or may be a multi-core processor (multi-CPU). The processor herein may be one or more devices, circuits, and/or processing cores configured to process data (for example, computer program instructions).

In specific implementation, in an embodiment, the apparatus may further include an output device 3105 and an input device 3106. The output device 3105 communicates with the processor 3101, and may display information in a plurality of manners. For example, the output device 3105 may be a liquid-crystal display (LCD), a light-emitting diode (LED) display device, a cathode-ray tube (CRT) display device, a projector, or the like. The input device 3106 communicates with the processor 3101, and may receive user input in a plurality of manners. For example, the input device 3106 may be a mouse, a keyboard, a touchscreen device, a sensor device, or the like.

In an example, with reference to the apparatus shown in FIG. 19, the obtaining module 1701 and the identification module 1702 in FIG. 17 may be implemented by the transmission interface 3104 and the processor 3101 in FIG. 19. This is not limited in this embodiment of this disclosure.

In another example, with reference to the apparatus shown in FIG. 19, the receiving module 1801 and the reporting module 1802 in FIG. 18 may be implemented by the transmission interface 3104 and the processor 3101 in FIG. 19. This is not limited in this embodiment of this disclosure.

An embodiment of this disclosure provides a computer-readable storage medium. The computer-readable storage medium stores computer program instructions. When the computer program instructions are executed by a computer or a processor, the method provided in any one of the foregoing embodiments of this disclosure is implemented. For example, the method shown in FIG. 3 or the method on a primary node side shown in FIG. 4 or the method on a first secondary node side shown in FIG. 4 may be performed.

An embodiment of this disclosure provides a computer program product including instructions. When the instructions run on a computer or a processor, the computer or the processor is enabled to perform the method provided in any one of the foregoing embodiments of this disclosure. For example, the method shown in FIG. 3 or the method on a primary node side shown in FIG. 4 or the method on a first secondary node side shown in FIG. 4 may be performed.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include a copper transmission cable, fiber transmission, wireless transmission, a router, a firewall, a switch, a gateway computer, and/or an edge server. A network adapter card or a network interface in each computing/processing device receives computer-readable program instructions from a network, and forwards the computer-readable program instructions for storage in a computer-readable storage medium in each computing/processing device.

The computer program instructions used to perform operations in this disclosure may be assembly instructions, instruction set architecture (ISA) instructions, machine instructions, machine-related instructions, microcode, firmware instructions, status setting data, or source code or target code written in one programming language or any combination of a plurality of programming languages. The programming languages include object-oriented programming languages such as Smalltalk and C++, and a conventional procedural programming language such as "C" or a similar programming language. The computer-readable program instructions may be executed entirely on a user's computer, executed partially on the user's computer, executed as a standalone software package, executed partially on the user's computer and partially on a remote computer, or entirely on the remote computer or a server. When the remote computer is involved, the remote computer may be connected to a user computer over any type of network, including a local area network (LAN) or a wide area network (WAN), or may be connected to an external computer (for example, connected by using an Internet service provider over the Internet). In some embodiments, an electronic circuit, such as a programmable logic circuit, a field-programmable gate array (FPGA), or a programmable logic array (PLA), is personalized by utilizing state information of the computer-readable program instructions. The electronic circuit may execute the computer-readable program instructions, to implement various aspects of this disclosure.

The various aspects of this disclosure are described herein with reference to the flowcharts and/or the block diagrams of the method, the apparatus (system), and the computer program product according to embodiments of this disclosure. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

Flowcharts and block diagrams in the accompanying drawings show architectures, functions, and operations that may be implemented by an apparatus, a system, a method, and a computer program product according to a plurality of embodiments of this disclosure. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions indicated in the blocks may occur in a different order than those indicated in the accompanying drawings. For example, two consecutive blocks may actually be executed substantially in parallel, and sometimes may be executed in a reverse order, depending on a function involved.

It should be further noted that each block in the block diagrams and/or flowcharts and combinations of blocks in the block diagrams and/or flowcharts may be implemented by hardware that performs a corresponding function or action (for example, a circuit or an ASIC), or may be implemented by a combination of hardware and software, such as firmware.

Although the present disclosure is described with reference to embodiments, in a process of implementing the present disclosure that claims protection, a person skilled in the art may understand and implement another variation of the disclosed embodiments by viewing the accompanying drawings, the disclosed content, and the accompanying claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not indicate that these measures cannot be combined to produce a better effect.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:

obtaining, by a primary node, characteristic data of a plurality of secondary nodes in a low-voltage transformer area, wherein the characteristic data comprises first characteristic data of two secondary nodes that have a direct connection relationship in the low-voltage transformer area, wherein the characteristic data comprises at least one of delay data or channel quality data, wherein the delay data comprises a first delay for transmitting information on a power line between the two secondary nodes, wherein the channel quality data comprises a power line channel quality between the two secondary nodes, and wherein obtaining the characteristic data comprises:
- sending a first packet to a target secondary node;
- obtaining a first moment of sending the first packet;
- receiving a second packet from the target secondary node;
- obtaining a second moment of receiving the second packet;
- sending a third packet to the target secondary node;
- receiving a fourth packet from the target secondary node, wherein the fourth packet comprises a first internal delay of the target secondary node, a third moment of receiving the first packet at the target secondary node, and a fourth moment of sending the third packet to the target secondary node; and
- calculating a first delay between the primary node and the target secondary node based on the first moment, the second moment, a second internal delay of the primary node, the first internal delay, the third moment, and the fourth moment; and identifying, by the primary node, a topology of the low-voltage transformer area based on the characteristic data.

2. The method of claim 1, wherein the characteristic data further comprises second characteristic data of the primary node and a secondary node that is in the low-voltage transformer area and that has a direct connection relationship with the primary node, and wherein obtaining the characteristic data further comprises:

sending, by the primary node, indication information to a first secondary node, wherein the indication information indicates to the first secondary node to report the characteristic data; and receiving, by the primary node and from the first secondary node, the first characteristic data and the second characteristic data.

3. The method of claim 1, wherein at least one physical phase is comprised between the two secondary nodes, and wherein the first characteristic data comprises two pieces of characteristic data that have a same physical phase between the two secondary nodes.

4. The method of claim 1, wherein the first delay is based on the first moment, the second moment, and internal delays, wherein the two secondary nodes comprise a first secondary node that is coupled to a first end of the power line for sending first information and receiving second information, wherein the first internal delay comprises a second delay between a fifth moment of sending the first information from the first secondary node and a sixth moment of the first information arriving at the first end of the power line, and wherein the first internal delay further comprises a third delay between a seventh moment of the second information arriving at the first end of the power line and an eighth moment of receiving the second information at the first secondary node.

5. The method of claim 1, further comprising:

performing cluster analysis based on the channel quality data to obtain at least one cluster, wherein channel quality data between the nodes in a same cluster meets a second preset condition;

identify a first connection relationship between different clusters based on the channel quality data and the at least one cluster;

identify a node connection relationship between two directly connected clusters based on electric power data and the first connection relationship;

identify a second connection relationship between nodes in each cluster based on the electric power data; and identify the topology of the low-voltage transformer area based on the first connection relationship, the second connection relationship, and the node connection relationship.

6. An apparatus of a first secondary node, the apparatus comprising:

a memory configured to store instructions; and one or more processors coupled to the memory configured to execute the instructions to cause the apparatus to:

receive indication information from a primary node; and report characteristic data in response to the indication information, wherein the characteristic data comprises first characteristic data between two secondary nodes that have a direct connection relationship in a plurality of secondary nodes in a low-voltage transformer area, wherein the characteristic data identifies a topology of the low-voltage transformer area and comprises at least one of delay data or channel quality data, wherein the delay data is a first delay for transmitting information on a power line between the two secondary nodes, wherein the first delay between the two secondary nodes is based on first moments of sending information from the two secondary nodes, second moments of receiving information at the two secondary nodes, and internal delays, wherein the two secondary nodes comprise the first secondary node that is coupled to a first end of the power line for sending first information and receiving second information, wherein a first internal delay of the first secondary node comprises a second delay between a third moment of sending the first information from the first secondary node and a fourth moment of the first information arriving at the first end of the power line, wherein the first internal delay further comprises a third delay between a fifth moment of the second information arriving at the first end of the power line and a sixth moment of receiving the second information at the first secondary node, and wherein the channel quality data comprises quality of a power line channel between the two secondary nodes.

7. The apparatus of claim 6, wherein the characteristic data further comprises second characteristic data of the primary node and a secondary node that is in the low-voltage transformer area and that has a direct connection relationship with the primary node.

8. The apparatus of claim 6, wherein at least one physical phase is comprised between the two secondary nodes, and wherein the first characteristic data comprises two pieces of characteristic data that have a same physical phase between the two secondary nodes.

9. The apparatus of claim 6, wherein the one or more processors are further configured to execute the instructions to cause the apparatus to report electric power data in response to the indication information, wherein the electric power data comprises at least one of a voltage, a current, power, a power factor, a phase angle, waveform distortion of the voltage, waveform distortion of the current, power frequency, electric energy, a maximum demand, a load record, or an event record collected at a preset network time base (NTB).

10. The apparatus of claim 6, wherein the one or more processors are further configured to execute the instructions to cause the apparatus to:

send a first packet to a target node that is in the low-voltage transformer area and that has a direct connection relationship with the first secondary node;

obtain a first moment of sending the first packet;

receive a second packet from the target node;

obtain a second moment of receiving the second packet, wherein the second packet comprises a first internal delay of the target node, a third moment of receiving the first packet at the target node, and a fourth moment of sending the second packet to the target node; and calculate a first delay between the first secondary node and the target node based on the first moment, the second moment, the third moment, the fourth moment, the first internal delay, and a second internal delay of the first secondary node.

11. The apparatus of claim 6, wherein the channel quality data further comprises quality of a radio channel between the two secondary nodes.

12. An apparatus of a primary node, the apparatus comprising:

a memory configured to store instructions; and one or more processors coupled to the memory and configured to execute the instructions to cause the apparatus to:

obtain characteristic data of a plurality of secondary nodes in a low-voltage transformer area, wherein the characteristic data comprises first characteristic data of two secondary nodes that have a direct connection relationship in the low-voltage transformer area, wherein the characteristic data comprises at least one of delay data or channel quality data, wherein the delay data is a first delay for transmitting information on a power line between the two secondary nodes, wherein the channel quality data comprises a power line channel quality between the two secondary nodes, and wherein obtaining the characteristic data comprises:

sending a first packet to a target secondary node;

obtaining a first moment of sending the first packet;

receiving a second packet from the target secondary node;

obtaining a second moment of receiving the second packet, wherein the second packet comprises first delay data, and wherein the first delay data comprises a first internal delay of the target secondary node, a third moment of receiving the first packet at the target secondary node, and a fourth moment of sending the second packet to the target secondary node;

sending a third packet to the target secondary node;

receiving a fourth packet from the target secondary node, wherein the fourth packet comprises second delay data other than the first delay data in the first internal delay of the primary node, the third moment, and the fourth moment; and calculating a first delay between the primary node and the target secondary node based on the first moment, the second moment, a second internal delay of the primary node, the first internal delay, the third moment, and the fourth moment; and identify a topology of the low-voltage transformer area based on the characteristic data.

13. The apparatus of claim 12, wherein the characteristic data further comprises second characteristic data of the primary node and a secondary node that is in the low-voltage transformer area and that has a direct connection relationship with the primary node, and wherein obtaining the characteristic data further comprises:

sending indication information to a first secondary node;

receiving the first characteristic data from the first secondary node; and measuring the second characteristic data.

14. The apparatus of claim 12, wherein the fourth packet comprises second delay data other than the first delay data in the first internal delay, the third moment, and the fourth moment.

15. The apparatus of claim 12, wherein at least one physical phase is comprised between the two secondary nodes, and wherein the first characteristic data comprises two pieces of characteristic data that have a same physical phase between the two secondary nodes.

16. The apparatus of claim 12, wherein the first delay is based on the first moment, the second moment, and internal delays, wherein the two secondary nodes comprise a first secondary node that is coupled to a first end of the power line for sending first information and receiving second information, wherein a first internal delay of the first secondary node comprises a second delay between a third moment of sending the first information from the first secondary node and a fourth moment of the first information arriving at the first end of the power line, and wherein the first internal delay further comprises a third delay between a fifth moment of the second information arriving at the first end of the power line and a sixth moment of receiving the second information at the first secondary node.

17. The apparatus of claim 12, wherein the one or more processors are further configured to execute the instructions to cause the apparatus to obtain electric power data of the secondary nodes in the low-voltage transformer area, wherein the electric power data comprises at least one of a voltage, a current, power, a power factor, a phase angle, waveform distortion of the voltage, waveform distortion of the current, power frequency, electric energy, a maximum demand, a load record, or an event record collected in the low-voltage transformer area at a same network time base (NTB).

18. The apparatus of claim 17, wherein the one or more processors are further configured to execute the instructions to cause the apparatus to:

perform cluster analysis based on the delay data to obtain at least one cluster, wherein delay data between nodes in a same cluster meets a first preset condition;

identify a first connection relationship between different clusters based on the delay data and the at least one cluster;

identify a node connection relationship between two directly connected clusters based on the electric power data and the first connection relationship;

identify a second connection relationship between nodes in each cluster based on the electric power data; and identify the topology of the low-voltage transformer area based on the first connection relationship, the second connection relationship, and the node connection relationship.

19. The apparatus of claim 18, wherein the one or more processors are further configured to execute the instructions to cause the apparatus to:

perform statistical analysis based on the delay data to obtain a distance between the different clusters; and obtain, using the distance as an input variable of a minimum spanning tree algorithm, the first connection relationship.

20. The apparatus of claim 17, wherein the one or more processors are further configured to execute the instructions to cause the apparatus to perform data analysis on at least one of the delay data, the channel quality data, or the electric power data by using an intelligent algorithm to identify the topology, wherein the intelligent algorithm comprises at least one of an artificial neural network algorithm, a genetic algorithm, a simulated annealing algorithm, an ant colony algorithm, or a particle swarm optimization algorithm.

* * * * *